United States Patent [19]
Suwabe et al.

[11] Patent Number: 6,065,799
[45] Date of Patent: May 23, 2000

[54] CABIN-INSTALLATION STRUCTURE FOR CONSTRUCTION MACHINE

[75] Inventors: Tohru Suwabe; Shinji Iguchi, both of Niigate-ken, Japan

[73] Assignees: Komatsu EST Corporation, Niigata-ken; Komatsu Limited, Tokyo, both of Japan

[21] Appl. No.: 09/167,976

[22] Filed: Oct. 8, 1998

[30] Foreign Application Priority Data

Oct. 9, 1997 [JP] Japan ..................................... 9-276989

[51] Int. Cl.$^7$ ....................................................... H01R 4/60
[52] U.S. Cl. ............................... 296/190.04; 296/190.08; 180/89.12; 180/89.18
[58] Field of Search ......................... 296/190.01, 190.04, 296/190.08, 190.06, 26.05, 26.04, 35.3; 180/89.12, 89.13, 89.18

[56] References Cited

U.S. PATENT DOCUMENTS

| | | | |
|---|---|---|---|
| 3,252,546 | 5/1966 | Allin, Jr. ......................... | 296/190.04 X |
| 4,556,117 | 12/1985 | Frey et al. ............................ | 180/89.13 |
| 5,326,148 | 7/1994 | Kojima et al. . | |
| 5,673,767 | 10/1997 | Uno et al. ............................ | 180/89.12 |

FOREIGN PATENT DOCUMENTS

| | | |
|---|---|---|
| 61-18519 | 1/1986 | Japan . |
| 4-125921 | 11/1992 | Japan . |

*Primary Examiner*—D. Glenn Dayoan
*Assistant Examiner*—Patricia Engle
*Attorney, Agent, or Firm*—Hill & Simpson

[57] ABSTRACT

A cabin is movable along the outer side surfaces of an operator cab floor by a vertical drive means. Specifically, pinions fixed to left and right end portions of a shaft are driven and rotated by motors installed on the operator cab floor. Rack gears engaged with the pinions are fixed to the cabin. Even when the cabin is moved and situated at its lowermost position, where the lower edges of the cabin project downwards below the operator cab floor, by the rack gears by rotations of the pinions, a single door which is continuous in the vertical direction can be installed on a side plate. Therefore, even when the whole height of the cabin is lowered to its limit, the door can be opened and closed without troubles. The shaft also functions to synchronize the rotations of the left and right pinions mechanically, thereby preventing torsion of the cabin.

8 Claims, 23 Drawing Sheets

CABIN-INSTALLATION STRUCTURE FOR CONSTRUCTION MACHINE

BACKGROUND OF THE INVENTION

1. Field of the Invention

The present invention relates to a structure for installing a cabin to a construction machine such as a motor grader, a hydraulic shovel, a wheel loader, and so on.

2. Description of the Related Art

When a construction machine is transported by being mounted on a loading space of a truck, with its cabin installed on the body of the machine, the whole height of the truck may exceed a height limit for transportation due to an existence of the cabin.

In particular, when a motor grader which is so constructed as to have a tall cabin so that an operator can stand in the cabin during operation is transported on a loading space of a truck, the whole height of the truck exceeds a height limit for transportation.

In this case, the motor grader is transported after removing the cabin, which is installed on the body of the motor grader at a construction site. Such installation and removing works are complicated and troublesome.

There has been a known installation structure in which a lower housing and an upper housing are engaged with each other to form a cabin such that the housings are movable in the vertical direction and the lower housing is attached to a machine body, as is disclosed in Japanese Utility Model Laid-open Publication No. 4-125921.

According to the installation structure described above, the height of the cabin is decreased by moving downwards the upper housing, and the height of the cabin is increased by moving upwards the upper housing. Therefore, the height of the cabin can be increased when an operator rides in and operates the machine, and the height can be decreased during transportation of the machine so that the machine does not exceed the height limit for transportation.

Thus, according to the installation structure of the cabin as described above, the stroke of vertical movement of the upper housing is substantially half of a maximum height of the cabin, and therefore, the cabin can only be lowered substantially to the half of the maximum height of the cabin obtained when the upper housing is moved to the uppermost limit.

Therefore, in case where the height of the cabin (or the maximum cabin height) is large like a large-sized motor grader, the height sometimes exceeds a height limit for transportation even if the upper housing is moved to its lowermost position.

Further, in this structure, a door for opening and closing an entrance/exit of the cabin is divided into upper and lower parts and the upper door part is connected to the lower door part such that the upper door is movable in the vertical direction. Therefore, when the upper housing is moved downwards, the door cannot be opened or closed because the door parts are layered inside and outside. If the door can be opened or closed, the inside and outside door parts must be opened or closed one after another, and the structure of the door parts and the installation structure of the cabin are thus complicated.

SUMMARY OF THE INVENTION

Hence, the present invention has an object of providing a cabin installation structure for a construction machine, which solves the problems as described above.

According to a first aspect of the present invention, there is provided a cabin-installation structure for a construction machine, for installing a box-like cabin of which lower surface is opened, on a body of a construction machine having an operator cab floor, comprising: the cabin having a lateral-cross-sectional surface shape substantially similar to and slightly larger than a plane shape of the operator cab floor, and an inner surface positioned outside outer side surfaces of the operator cab floor and is movable in a direction vertical to the operator cab floor;

a guide mechanism for moving and guiding the cabin in said vertical direction; and a vertical-drive means for vertically moving the cabin between an upper position where a lower edge of the cabin is positioned at a height substantially equal to the operation cab floor and a lower position where the lower edge of the cabin projects downwards below the operator cab floor.

According to the first aspect as described above, since the cabin can be moved downwards below the operator cab floor, a vertical length of the cabin is much reduced so that the whole height of the machine transported by a truck or the like can not exceed a height limit for transportation. On the other hand, the vertical length of the cabin can be enlarged by moving the cabin to its uppermost position, which facilitates the operation by an operator.

According to a second aspect of the present invention, in addition to the above-described structure, the cabin further has at least one door-installation opening portion in a side surface of the cabin, said door-installation portion being continuous in said vertical direction so that a door installed on the door-installation opening portion can be opened and closed.

According to the second aspect as described above, since the door-installation opening portion of the cabin is continuous in the vertical direction, one single door can be installed and the door can always be opened and closed easily regardless of the movements of the cabin in the vertical direction. Also, the door itself can have a simple structure, so that a simple installation-structure can be adopted.

According to a third aspect of the present invention, the cabin-installation structure further comprises an urging means between the cabin and the operator cab floor for elastically urging the cabin upwards.

According to the third aspect as described above, the urging means for elastically urging the cabin upwards always acts to push up the cabin. Therefore, when the cabin is moved downwards, the urging means serves to buff impact so that the durability of the cabin and the body is improved. Further, when the cabin is moved upwards, the urging means subsidiarily drives up the cabin, so that only a small power of the drive motor is required, so the drive motor can be downsized. A gas spring or a compression spring may be used as the urging means.

According to a fourth aspect of the present invention, the vertical drive means according to one of the first to third aspects operates the cabin by supporting left and right side plates of the cabin and includes torsion-prevention means for preventing torsion of the cabin.

According to the fourth aspect as described above, when the cabin is vertically driven, it is possible to prevent the cabin from being damaged and stopped by torsion between the left and right side walls and the guide mechanism.

According to a fifth aspect of the present invention, the torsion-prevention means of the cabin is a connection member of a rigid body connecting respective portions of left and right side wall of the operator cab floor.

According to the fifth aspect as described above, since the respective portions of the left and right side walls of the operator cab floor are connected by a connection member of a rigid body, the elevation distances in the left and right sides are always equalized to each other. Therefore, smooth vertical movement can be performed without causing torsion between the left and right side walls.

According to a sixth aspect of the present invention, the torsion-prevention means of the cabin has a vertical-movement-distance-detector means and a comparison calculation circuit for controlling movement amounts of the left and right side plates of the cabin to be equalized to each other, based on comparison calculation results thereof.

According to the sixth aspect as described above, the vertical movement amounts of the left and right side plates are equalized to each other by controlling the vertical movements of the side plates. In this manner, smooth vertical movements can be achieved without causing torsion between the left and right side plates.

In this case, the connecting member is not needed, so that the lower space can therefore be widened.

The control means may be those for electrically detecting and controlling the rotation speed of a drive motor, control means for controlling and synchronizing expansion amounts of hydraulic cylinders used as a drive means, or means for detecting and controlling lengths of left and right wires wound up or extracted.

According to a seventh aspect of the present invention, there is provided a cabin-installation structure for a construction machine, for installing a box-like cabin of which lower surface is opened, on a body of a construction machine having an operator cab floor, comprising: the cabin having a lateral-cross-sectional surface shape substantially similar to and slightly larger than a plane shape of the operator cab floor, an inner surface positioned outside outer side surfaces of the operator cab floor and is movable in a direction vertical to the operator cab floor, and at least one door-installation opening portion on a side surface of the cabin, the door-installation opening portion being continuous in a direction vertical to the operator cab floor so that a door installed on the door-installation opening portion can be opened and closed; a guide mechanism for moving and guiding the cabin in said vertical direction; and a lock mechanism for locking the cabin at an upper position where a lower edge of the cabin is positioned at a height substantially equal to the operation cab floor and at a lower position where the lower edge of the cabin projects downwards below the operator cab floor.

According to the seventh aspect as described above, the cabin can be suspended by a machine such as a crane having a suspension ability to be moved between its upper and lower positions. At the positions, the cabin can be locked by a lock mechanism such as a pin.

According to an eighth aspect of the present invention, a side surface of the cabin has a step-like shape such that a front portion of a lower edge of the side surface forms a lower step and a rear portion of a lower edge of the side surface forms an upper step and such that the door-installation opening portion is formed at the front portion of the side surface, and when the cabin is positioned at the lower position, the front portion of the lower edge of the side surface projects downwards below the operator cab floor and the rear portion of the lower edge of the side surface is positioned to be slightly higher than the operator cab floor.

According to the eighth aspect as described above, when the cabin is at the lowermost position, the rear portion of the lower edge of the side surface of the cabin does not project downwards below the operator cab floor. Therefore, the rear portion of the side edge of the side surface of the cabin does not interfere with rear wheels such as of a motor grader.

DETAILED DESCRIPTION OF THE INVENTION

In the following, preferred embodiments of the present invention will be described in detail with reference to the appended drawings.

Figure 1:
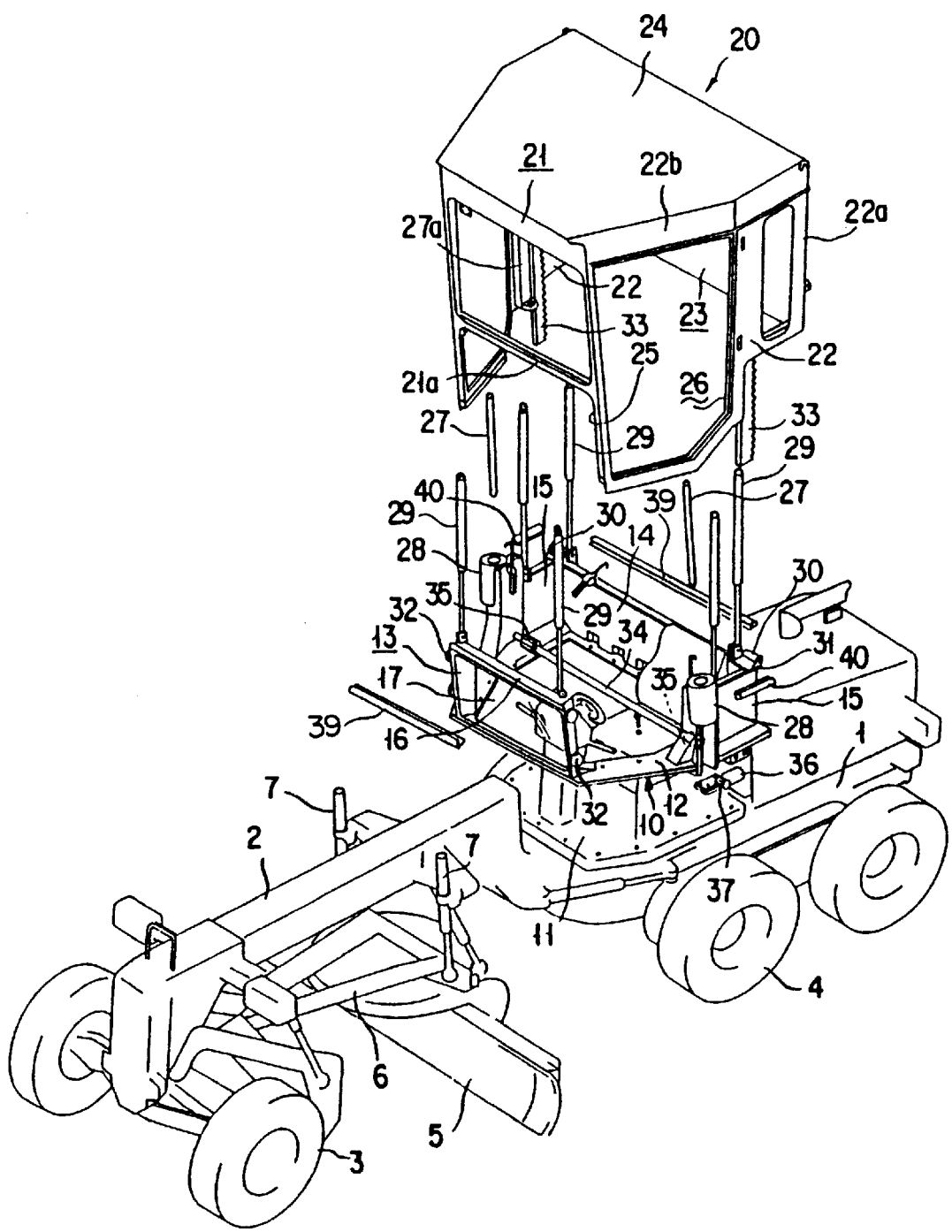
FIG. 1 is an exploded perspective view showing a first embodiment of the present invention.
Figure 2:
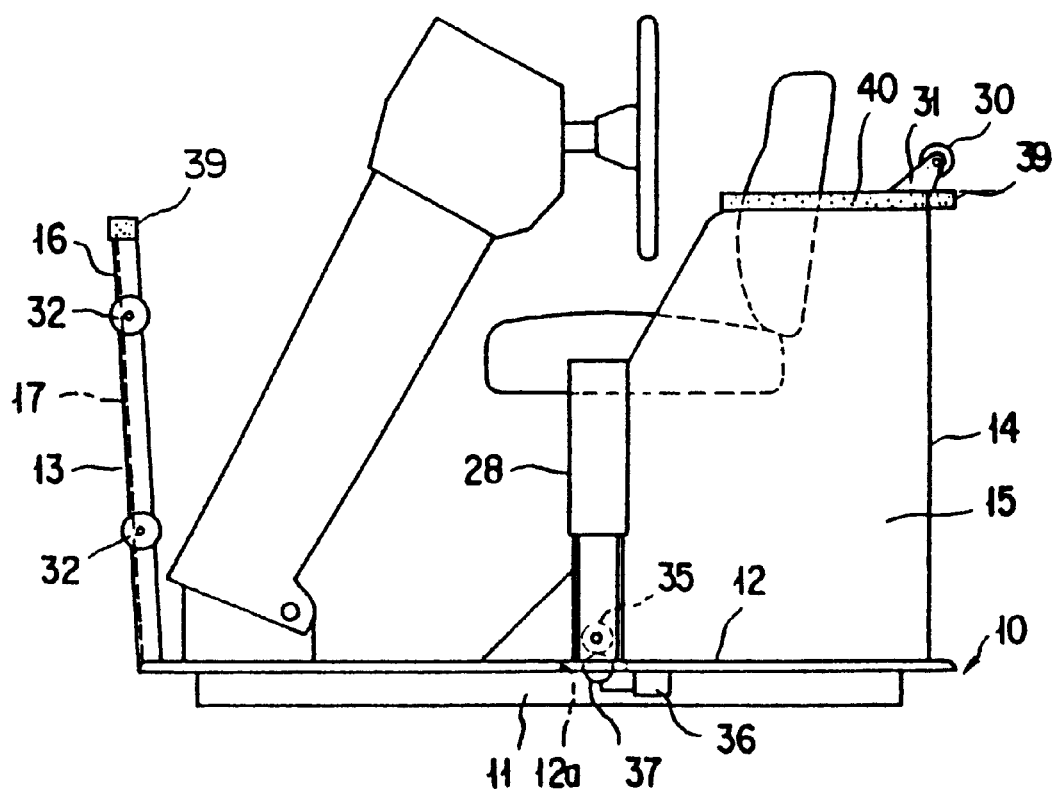
FIG. 2 is a side view of an operator cab floor.
Figure 3:
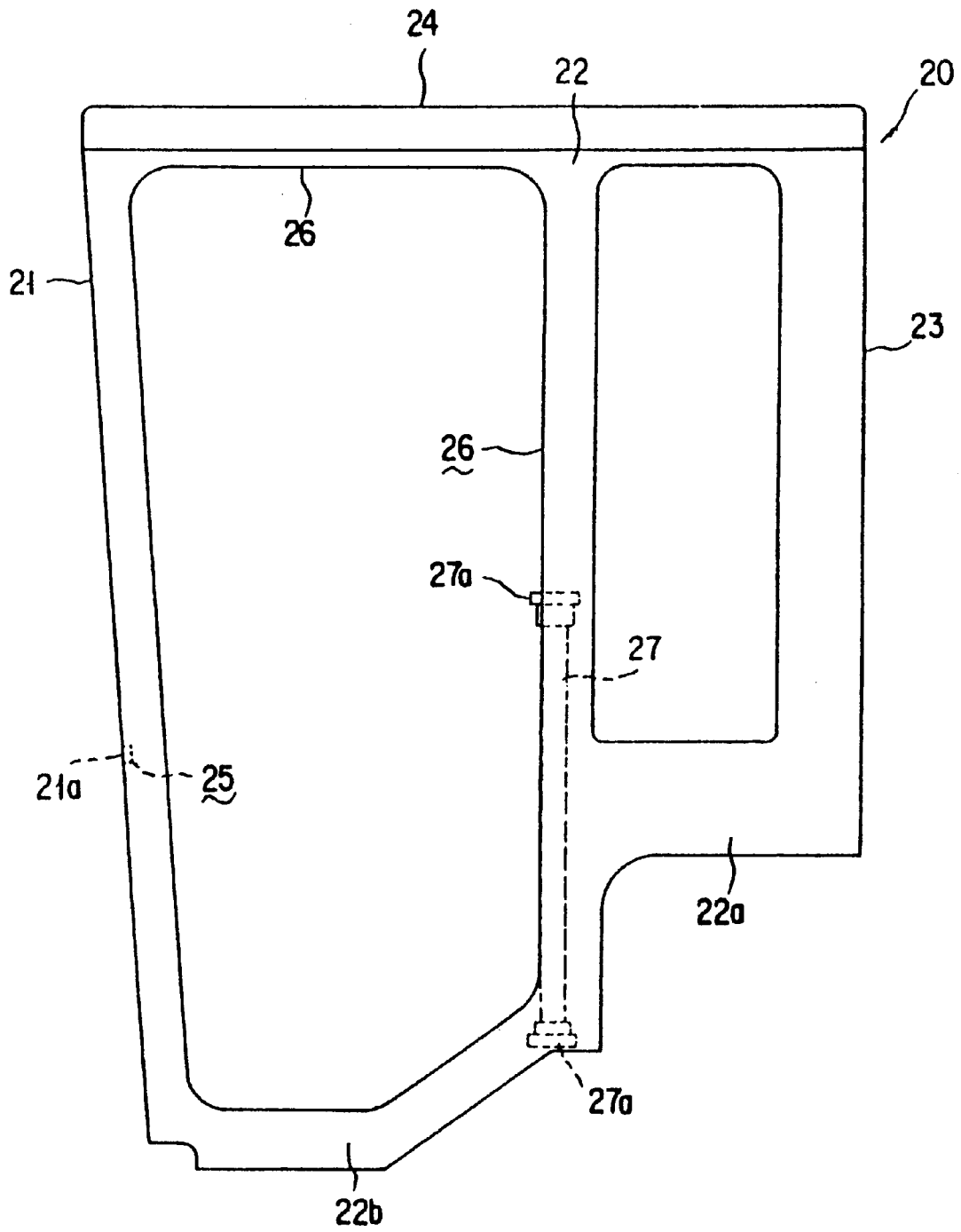
FIG. 3 is a side view of a cabin.

FIG. 1 shows a motor grader. A frame 2 is installed on a body 1 and is oriented forward. Front wheels 3 are equipped on the frame 2, and rear wheels 4 are equipped on the body 1. A draw bar 6 provided with a blade 5 is equipped on the frame 2 such that the draw bar 6 can pivotally move in the vertical direction by an elevation cylinder 7.

An operator cab floor 10 is installed on the body 1 at a portion toward the front side thereof. The operator cab floor 10 comprises a floor plate 11 of the body 1, a substantially ring-like plate 12 fastened by bolts to a periphery of the floor plate 11, a front lower window 13 standing along a front edge of the ring-like plate 12, a rear wall 14 standing along a rear edge of the ring-like plate 12, and left and right walls 15 standing respectively at the left and side edges of the ring-like plate 12 in the rear side thereof. An outer periphery of the floor plate 11 projects sidewards over the installation portion of the body 1, and the outer periphery of the ring-like plate 12 projects sidewards over the floor plate 11.

The front lower window 13 is a glass window in which a glass 17 is fitted in a rectangular frame 16. This window helps an operator to watch end portions of the blade 5 and the like without difficulty in case of a motor grader.

A cabin 20 has a substantially box-like shape surrounded by a front plate 21, left and right side plates 22, a rear plate 23, and a roof 24, and is opened in its lower side. A lateral cross-sectional shape or an inner shape of the cabin 20 is similar to and slightly larger than a plane shape of the operator cab floor 10.

A lower portion of the front plate 21 forms an opening portion 25, while an upper portion thereof forms a window. The opening portion 25 is to be overlapped on the outer sides of the front lower window 13 of the operator cab floor 10.

The rear plate 23 and rear portions 22a of the left and right side plates 22 of the cabin 20 are shorter than the front plate 21 and front portions 22b of the side plates 22. Door-installation opening portions 26 are formed continuously in the vertical direction in the front portions 22b of the side plates 22, and doors are attached to the door-installation opening portions 26 such that the doors can be freely opened and closed.

Upper and lower ends of guide rods 27 are installed on the cabin 20 through brackets 27a. The guide rods 27 are adapted to be engaged with guides 28 standing on the left and right walls 15. A plurality of gas springs 29 are provided between the cabin 20 and the operator cab floor 10 for urging the cabin 20 upwards. The gas springs 29 are elastic urging means in the present invention, but normal compression springs can be used in place of the gas springs.

A pair of rear guide rollers 30 are fitted by brackets 31 to the rear wall 14 respectively at portions toward the left and right sides thereof. The rear guide rollers 30 are located so as to slightly project over the outer surface of the rear wall 14 such that they can contact with an inner surface of the rear plate 23 of the cabin 20.

Further, two pairs of front guide rollers 32 are rotatably attached to upper and lower portions of the rectangular frame 16 of the front lower window 13, each pair being attached respectively to left and right sides of the rectangular frame 16. Each of the front guide rollers 32 is located so as to project forwardly of the rectangular frame 16 and contact each inner surface of the left and right sides of the front plate 21 of the cabin 20.

Rack gears 33 are respectively attached to the inner surfaces of the left and right side plates 22 of the cabin 20. The rack gears 33 project downwards below the lower end surfaces of the rear portions 22a of the side plates 22 and are respectively opposed to the inner surfaces of the left and right side walls 15.

A shaft 34 is rotatably attached between lower portions of the left and right side walls 15 of the operator cab floor 10. The shaft 34 is equipped at its opposite ends with pinions 35 which are respectively engaged with the rack gears 33. The shaft 34 guarantees smooth vertical movement of the cabin 20 by mechanically preventing the left and right side walls 15 from being twisted by torsion due to a difference between elevation distances of the left and right rack gears 33 when the left and right pinions 35 are driven and rotated so as to elevate up and down the rack gears 33.

In the present invention, if the pinions 35 equipped on both ends of the shaft 34 are separated from a drive source and are simply engaged with the left and right rack gears 33, the torsion prevention function as described above can be performed. In this case, the left and right rack gears 33 are engaged with pinions optionally connected to a drive source.

According to the present embodiment, a motor 36 equipped with a decelerator is installed on a lower surface of the ring-like plate 12 of the operator cab floor 10, and a pinion 37 is engaged with one of the pinions 35 equipped on the shaft 34 through a hole 12a in the plate 12, to rotate and drive the shaft 34. This constructs a vertical drive means for the cabin 20.

A front sealing member 39 is attached on an upper edge portion of the rectangular frame 16. The sealing member 39 is pressed against an inner surface of an intermediate portion 21 of the front plate 21.

Further, a rear sealing member 39 is attached on an upper edge portion of the rear wall 14. The rear sealing member 39 is pressed against an inner surface of the rear plate 23.

Side sealing members 40 are respectively attached on the left and right side walls 15 in the rear side. The side sealing members 40 are to be respectively pressed against the inner surfaces of the rear portions 22a of the left and right side plates 22.

Figure 4:
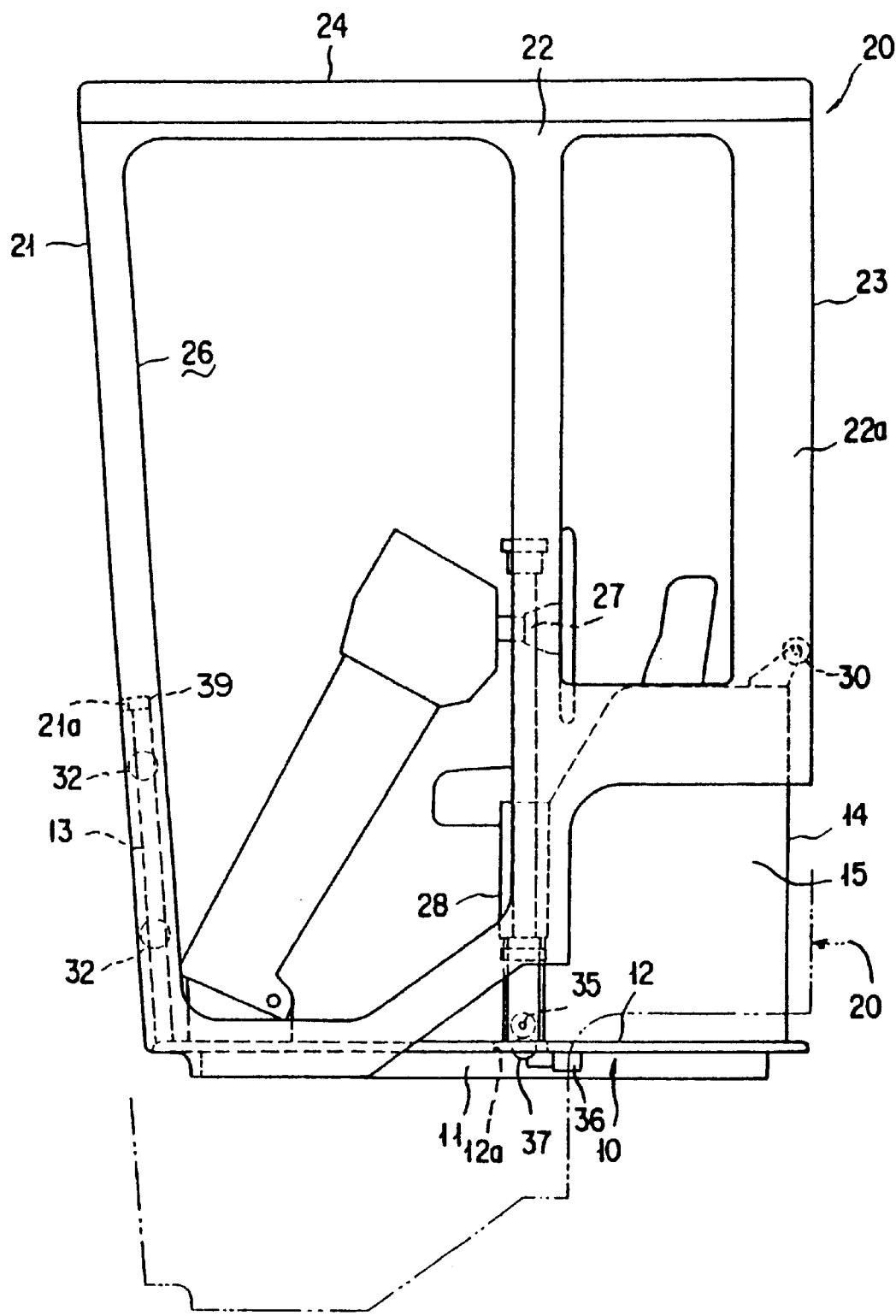
FIG. 4 is a side view showing a state in which the cabin is installed.

An uppermost position of the cabin 20 raised most is illustrated by continuous lines in FIG. 4. In this state, the front lower window 13 of the operator cab floor 10 and the opening portion 25 of the cabin 20 are fitted on each other, and the front sealing member 39 is arranged so as to be pressed into contact with an inner surface of the intermediate portion 21a of the front plate 21. Respective upper edge portions of the rear wall 14 and the left and right rear side walls 15 of the operator cab floor 10 are overlapped on or come into contact with respective lower edge portions of the rear plate 23 and the rear portions 22a of the left and right side plates 22 of the cabin 20, and the regions thus overlapped or contacted are sealed by a rear sealing member 39 and a side sealing members 40.

When the motor 36 is driven to rotate the shaft 34 in the state described above, the pinions 35 are rotated in one direction thereby moving the cabin 20 downwards by the rack gears 33 to the lowermost position indicated by dash-and-dotted lines in FIG. 4, which is the lowermost position of the cabin 20. In this manner, the whole height of the cabin 20 is decreased. Recessed portions (not shown) are formed in the operator cab floor 10 so that the rack gears 33 might not interfere with the operator cab floor 10.

When the motor 36 is driven to rotate the shaft 34 and the pinions 35 in the opposite direction in the state described above, the cabin 20 is moved upwards in a similar manner.

When the cabin 20 is moved up or down, the cabin 20 is guided by the front guide roller 32 and the rear guide roller 30, the guide rods 27, and the guide 28, so that the cabin 20 can be smoothly moved up or down in cooperation with the shafts 34.

Further, since the cabin 20 is urged upwards by the gas springs 29, a heavy body of the cabin 20 can be moved upwards by even a small force. Also, since a cushioning effect is obtained when the cabin 20 is moved downwards, impact is small when the cabin 20 reaches a lower limit position, and a durability of the cabin 20 and the body 1 can be improved.

Figure 5:
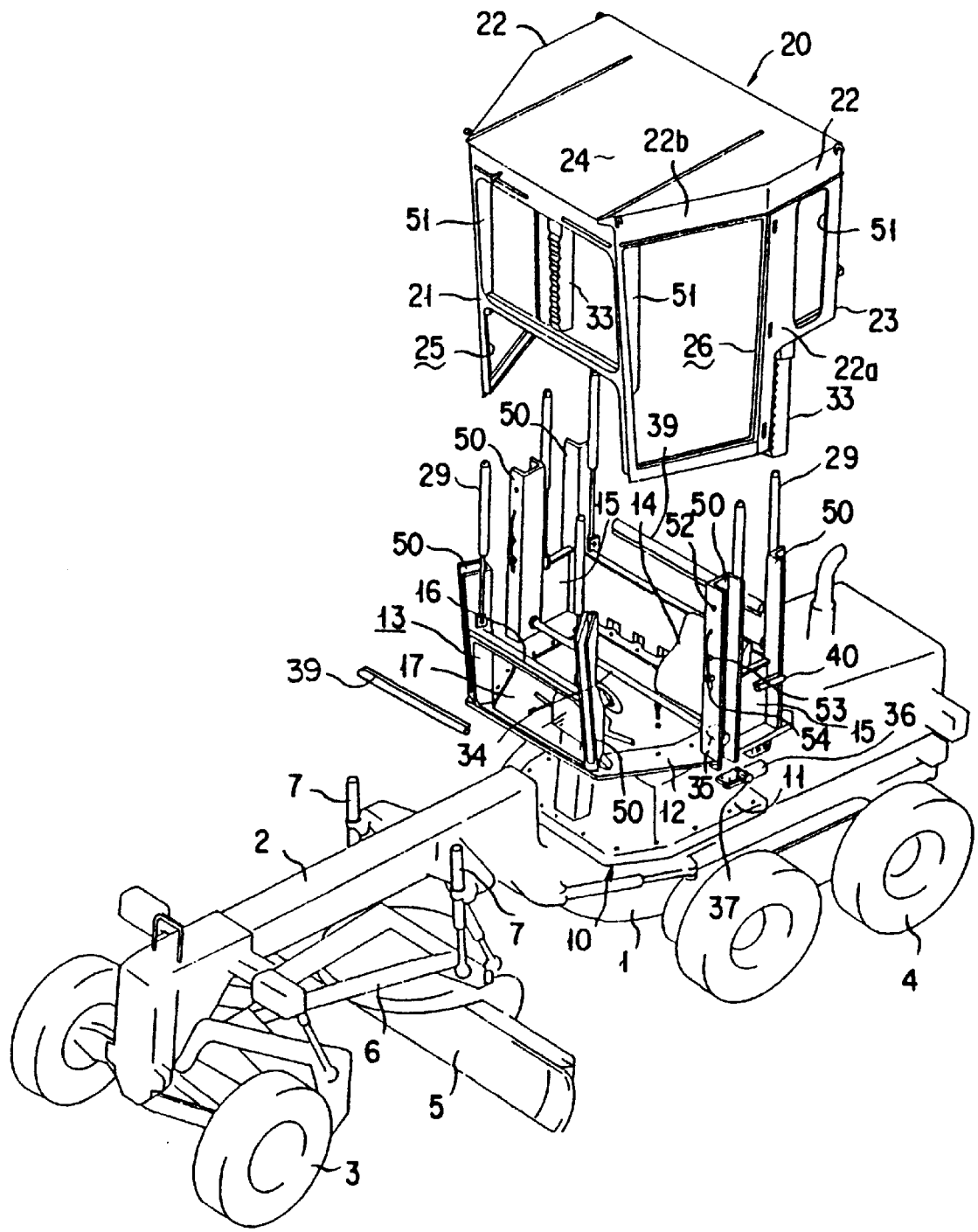
FIG. 5 is an exploded perspective view showing a second embodiment of the present invention.

FIG. 5 shows a second embodiment of this invention. The operator cab floor 10 has a plurality of guide rails 50 standing on the ring-like plate 12, while the cabin 20 is provided with a plurality of guide columns 51. The guide columns 51 are adapted to be engaged with the guide rails 50 so that the cabin 20 is vertically movable. Rack gears 33 are provided, which also serve as guide columns. A shaft 34 is rotatably attached between left and right guide rails 50 to be engaged with the rack gears 33, and pinions 35 on the shaft 34 are engaged with the rack gears 33. The other constructions of this second embodiment are substantially identical with those of the first embodiment.

Upper holes 52 and lower holes 53 are formed in the guide rails 50 engaged with the rack gears 33. The cabin 20 is fixed to a uppermost position by inserting lock pins 54 from the upper holes 52 into pin holes not shown, which are formed in the guide columns 51. The cabin 20 is fixed to a lowermost position by inserting the lock pins 54 from the lower holes 53 into the pin holes. A lock mechanism is thus constructed.

If such a lock mechanism is provided, it is possible to hang up the cabin by a crane or the like without providing rack gears and pinion gears, and the cabin can then be locked at its upper or lower position.

Figure 6:
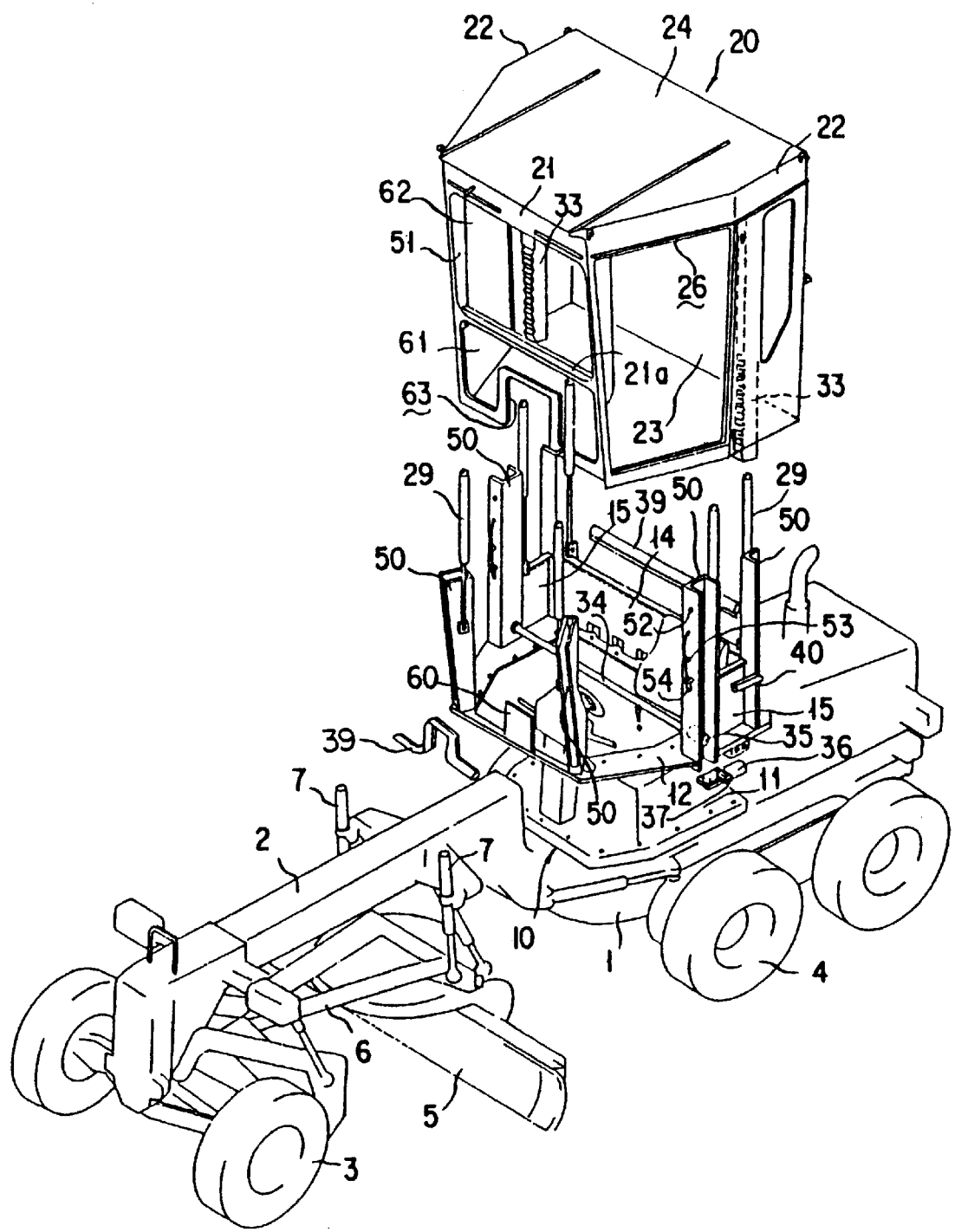
FIG. 6 is an exploded perspective view showing a third embodiment of the present invention.

FIG. 6 shows a third embodiment in which a standing member 60 is fixed to a front edge of the ring-like plate 12 and a front sealing member 39 is attached on the standing member 60.

A front plate 21 of the cabin 20 has a lower window 61 and an upper window 62 which are separated by an intermediate portion 21a. A concave portion 63 oriented downwards to be engaged with the standing member 60 is formed at a lower edge of the lower window 61, such that the front sealing member 39 is pressed into contact therewith when the cabin 20 is at the uppermost position.

The side plates 22 and the rear plate 23 of the cabin 20 have the same length as the front plate 21, so that four peripheral edges of the lower end surface of the cabin 20 are continuous in one plane.

In this case, an outer edge portion of the operator cab floor 10 is positioned higher than the upper surface of the body 1, so that the lower peripheral edge portions of the cabin 20 do not interfere with the body 1 when moved below the outer edge portion of the operator cab floor 10.

Figure 7B:
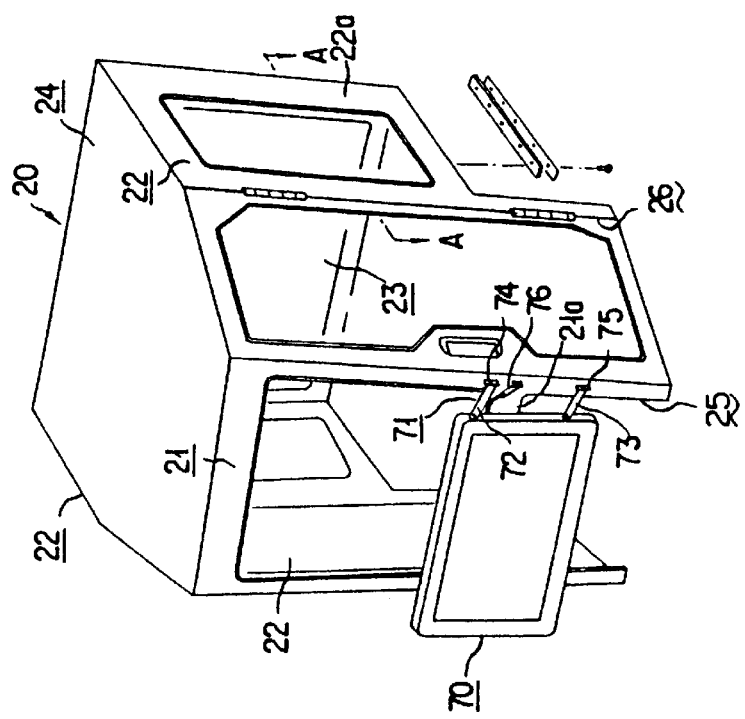
FIGS. 7A and 7B are exploded perspective views respectively showing an operator cab floor and a cabin according to a fourth embodiment of the present invention.
Figure 7A:
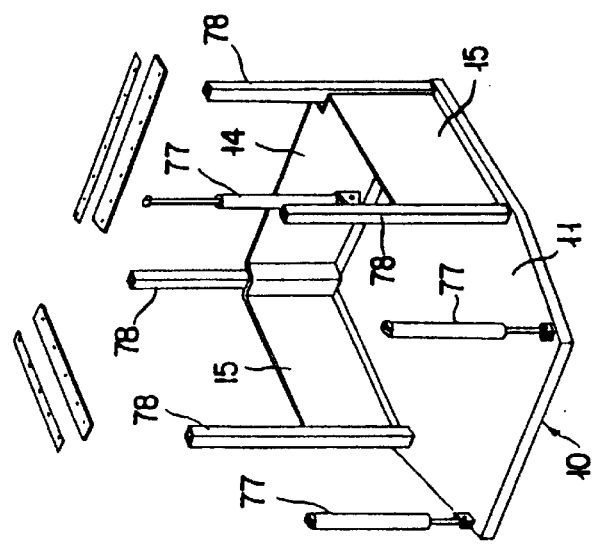
Figure 8:
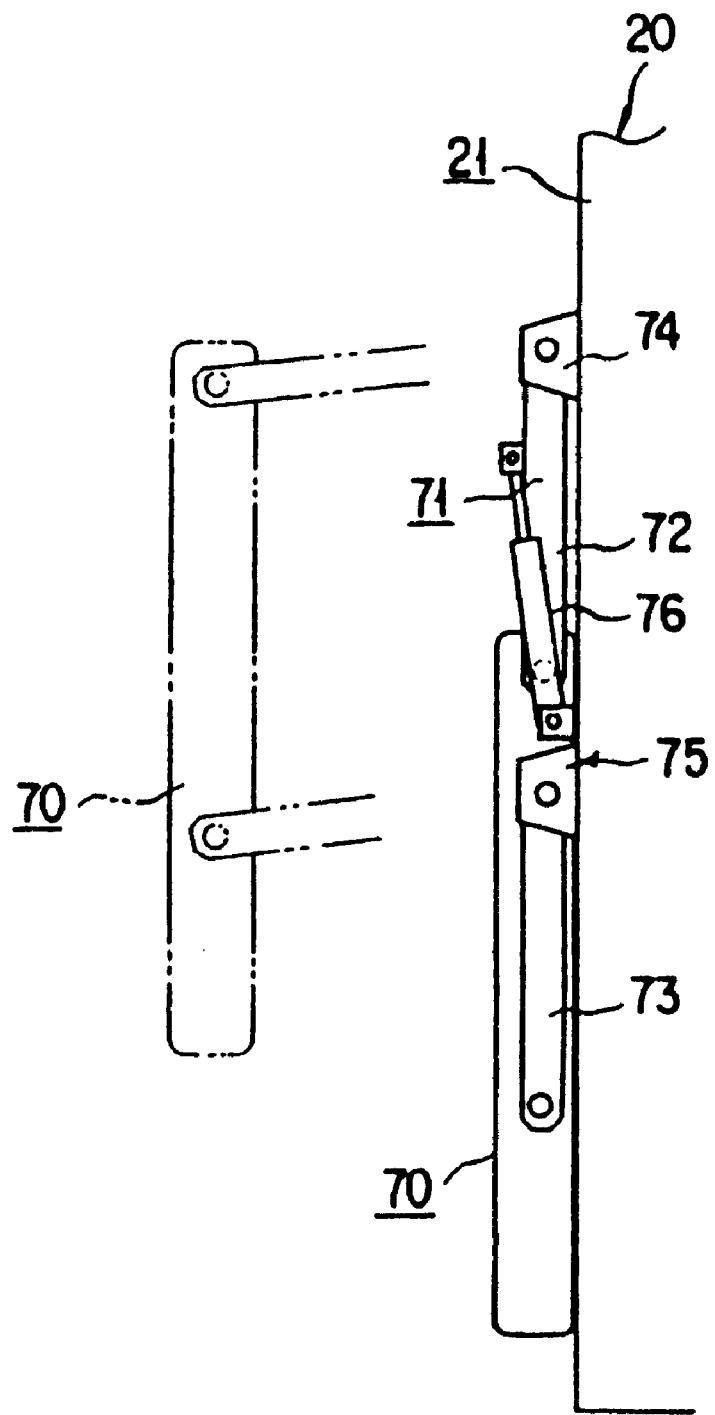
FIG. 8 is a side view of a lower window-installation portion of a cabin.

FIGS. 7A and 7B show a fourth embodiment in which a lower window 70 is attached on an opening portion 25 of the front plate 21 of the cabin 20 such that the lower window 70 can be moved obliquely forwards and backwards by a link mechanism 71. Specifically, as shown in FIG. 8, each one of end portions of upper links 72 and lower links 73 is attached respectively on left and right longitudinal edges of the lower window 70 such that the window 70 can pivotally move up and down. The other end portions of the upper links 72 and the lower links 73 are respectively attached on upper brackets 74 and lower brackets 75 on the left and right longitudinal edges of the opening portion 25, for pivotal movement. Gas springs 76 are provided between the left and right longitudinal edge portions of the opening portion 25 and the upper links 72.

Based on such a structure as described above, the lower window 70 can be moved parallel between a closed position where the lower window 70 is in contact with the outer surface of the edges of the opening portion 25 to close the opening portion 25 and an opened position where the lower window 70 is distant from the outer surface of the edges of the opening portion 25 and is above the closed position.

The lower edge of the lower window 70 at the closed position is arranged to be brought into contact with an upper surface of an front end portion of the floor plate 11 when the cabin 20 is at its uppermost position. When the cabin 20 is moved downwards, the lower window 70 is set at the opened position so that the window 70 is positioned forward of the front end portion of the floor plate 11 thereby to avoid interference.

As shown in FIG. 7A, the operator cab floor 10 comprises a floor plate 11, a rear wall 14 standing along a rear edge of the floor plate 11, and left and right side walls 15 standing from the left and right side edges of the floor plate 11 in the rear side thereof. Expansion cylinders 77 are respectively provided at the left and right side edges of the floor plate 11 in the front side thereof, and at a laterally-middle portion of the floor plate 11 in the rear side thereof.

Figure 9:
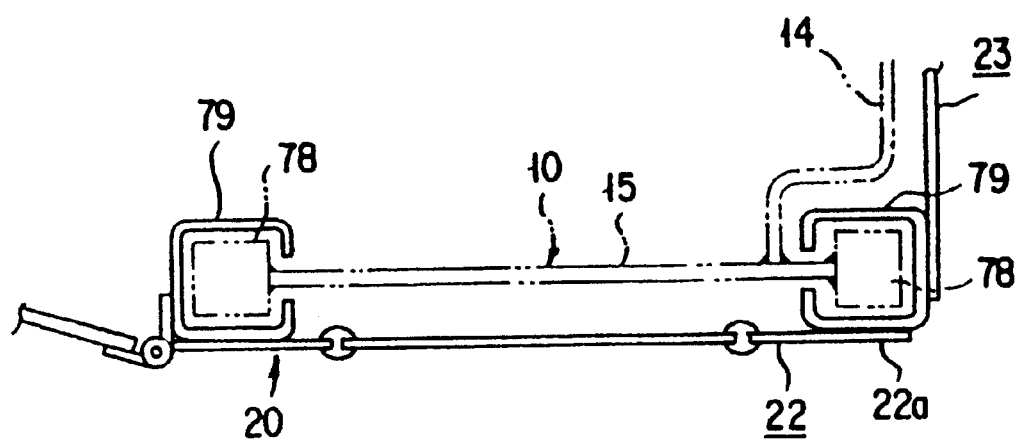
FIG. 9 is a cross-sectional view taken along a line A—A in FIG. 7B.

Guides 78 are respectively fixed to middle portions and rear end portions of the left and right side edges of the floor plate 11, while guide members 79 are respectively attached at corresponding middle portions and rear end portions of the inner surfaces of the left and right sides of the cabin 20, as shown in FIG. 9. The guide members 79 are engaged with the guides 78 so as to be movable vertically along the guides 78.

In case of the present embodiment, the expansion cylinders 77 expand and contract to move the cabin 20 vertically. However, the cabin 20 may be moved vertically by using pinions and rack gears as described in the previous embodiments.

Now, a fifth embodiment of the present invention will be explained below.

Figure 10:
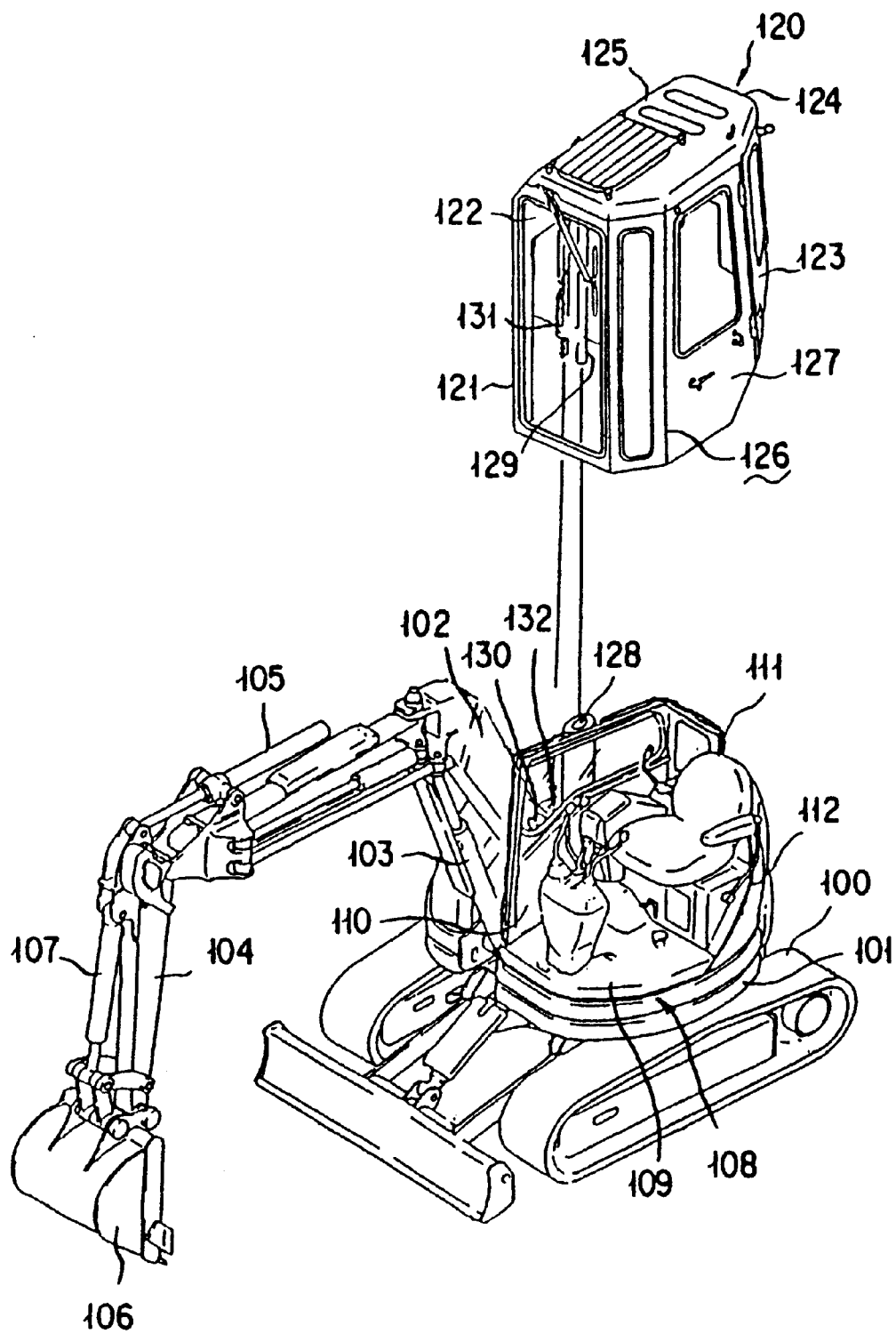
FIG. 10 is an exploded perspective view showing a fifth embodiment of the present invention.

FIG. 10 shows an example of a hydraulic shovel. A body 101 is rotatably installed on a transporter 100. The body 101 has a boom 102 at a laterally-middle portion of the body 101 such that the boom 102 can pivotally move by a boom cylinder 103. The boom 102 has an arm 104 attached thereto such that the arm 104 can pivotally move up and down by an arm cylinder 105. Further, the arm 104 has a bucket 106 attached thereto such that the bucket 106 can pivotally move up and down by a bucket cylinder 107.

Figure 11:
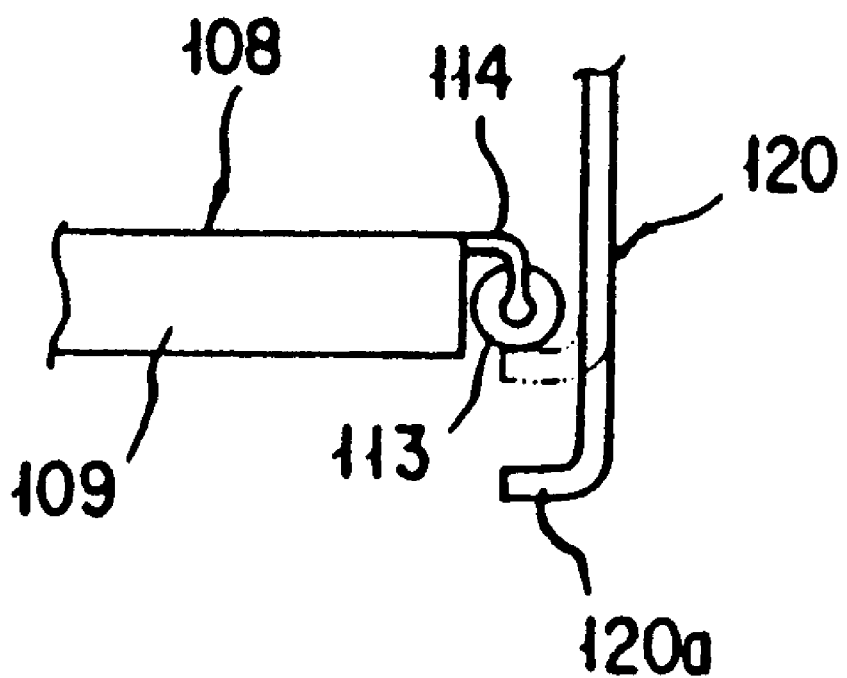
FIG. 11 is a plan view explaining the sealing-member-installation portion.

The body 101 has a substantially circular plane. An operator cab floor 108 is attached on the body 101 at a side toward one of the left and right sides of the body 101. The operator cab floor 108 has a floor plate 109 having a plane shape of a substantially semicircular shape, a side wall 110 standing along a linear side edge portion of the floor plate 109, a rear wall 111, and a rear side wall 112 at the other side edge portion of the floor plate 109. As shown in FIG. 11, a sealing member 113 oriented downwards is attached along an upper portion of an outer edge of the operator cab floor 108 via an attaching member 114.

The sealing member 113 projects outwards of the outer side surface of the operator cab floor 108.

A cabin 120 is in a form of a box which is surrounded by a front plate 121, a side plate 122 on one of its left and right sides, a side plate 123 in its other side, a rear plate 124, and a roof 125 and is opened downwards. The side plate 122 and a portion of the rear plate 124 which is close to the side plate 122 are shorter than a rear portion of the side plate 123. A door-installation opening portion 126 is formed at a front portion of the side plate 123, and a door 127 is installed on the door-installation opening portion 126 such that the door 127 can be opened and closed.

The inner shape of the cabin 120 is similar to and is slightly larger than the plane shape of the operator cab floor 108. The cabin 120 is installed on the operator cab floor 108 so as to be vertically movable by a guide 128 and a guide rod 129.

A motor 130 having a pinion gear and a decelerator is installed on the outer surface of the side wall 110. Further, a rack gear 131 is provided inside the cabin 120. The rack gear 131 is engaged with a pinion 132 driven by the motor 130.

Figure 12:
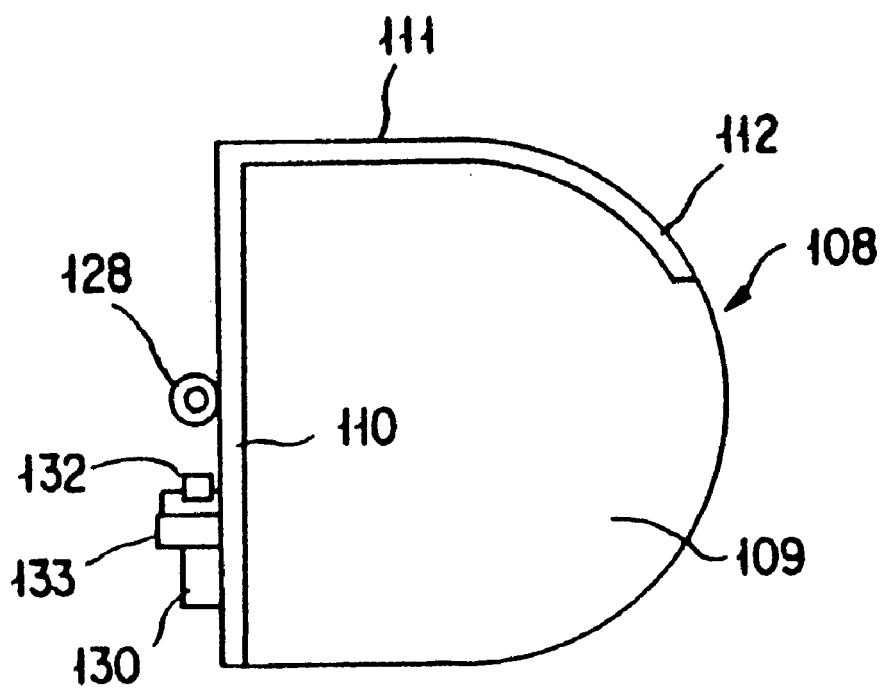
FIG. 12 is a plan view of the operator cab floor.

Specifically, as shown in FIG. 12, an output torque from the motor 130 is transmitted to the pinion 132 through the decelerator 133 thereby rotating the pinion 132, and the cabin 120 is moved up and down through the rack gear 131.

Figure 13:
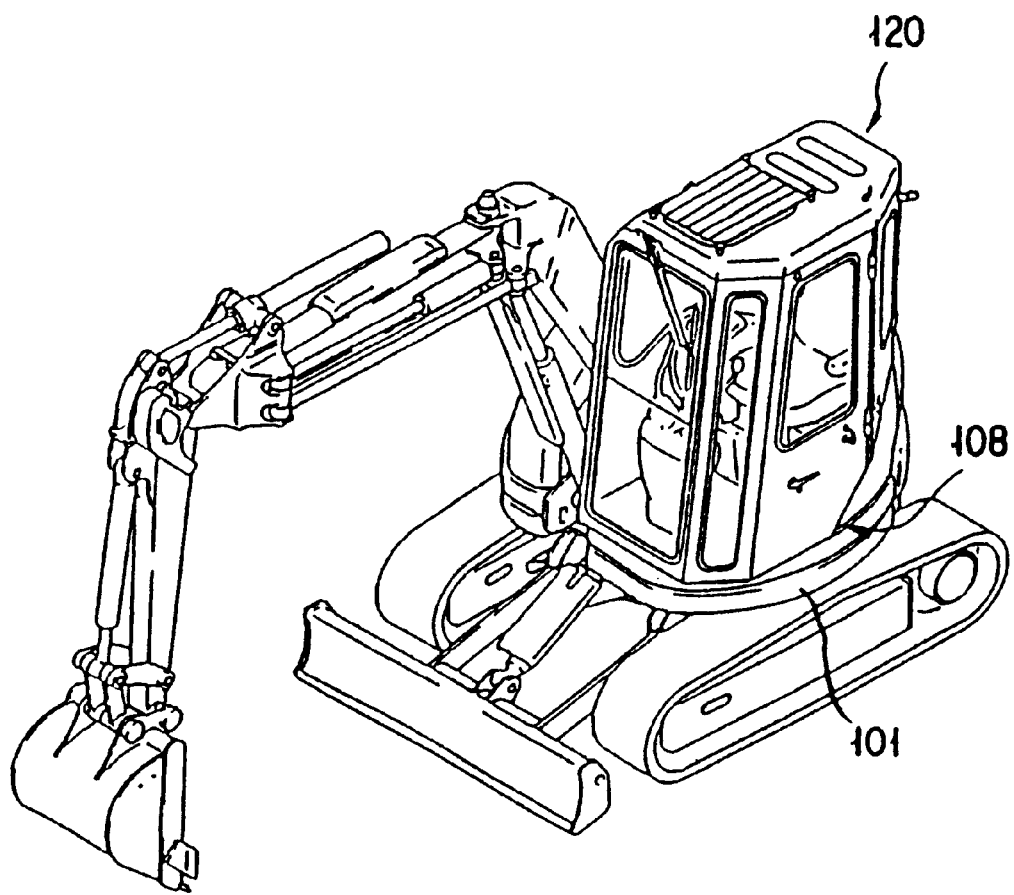
FIG. 13 is a perspective view where the cabin is situated at an upper position.

For example, as shown in FIG. 13, the cabin 120 is moved upwards to attain an uppermost height. At that time, a bent portion 120a at a lower edge portion of the cabin 120 is pressed into contact with a sealing member 113, as indicated by dash-and-dotted line in FIG. 11, to maintain air-tightness and water-tightness between the cabin 120 and the operator cab floor 108.

Figure 14:
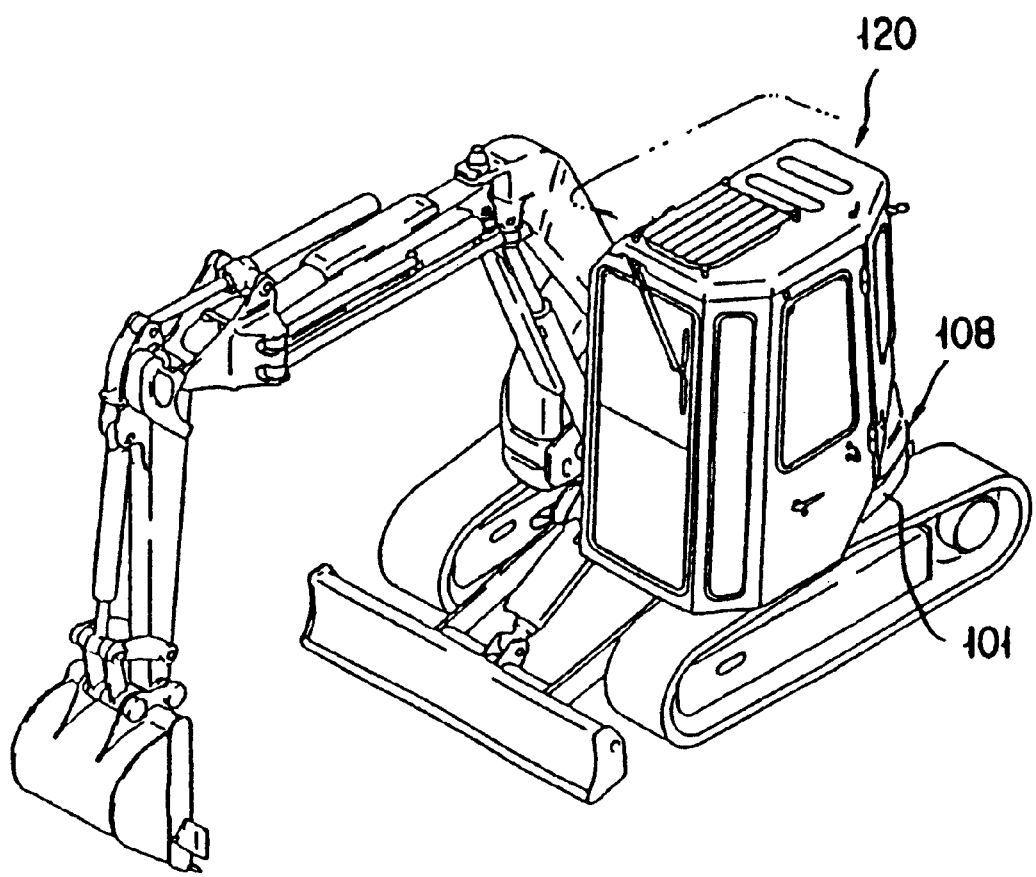
FIG. 14 is a perspective view where the cabin is situated at a lower position.

Further, as shown in FIG. 14, the cabin 120 is moved downwards to attain a lowermost height.

Now, description will be made of a sixth embodiment of the present invention.

Figure 15:
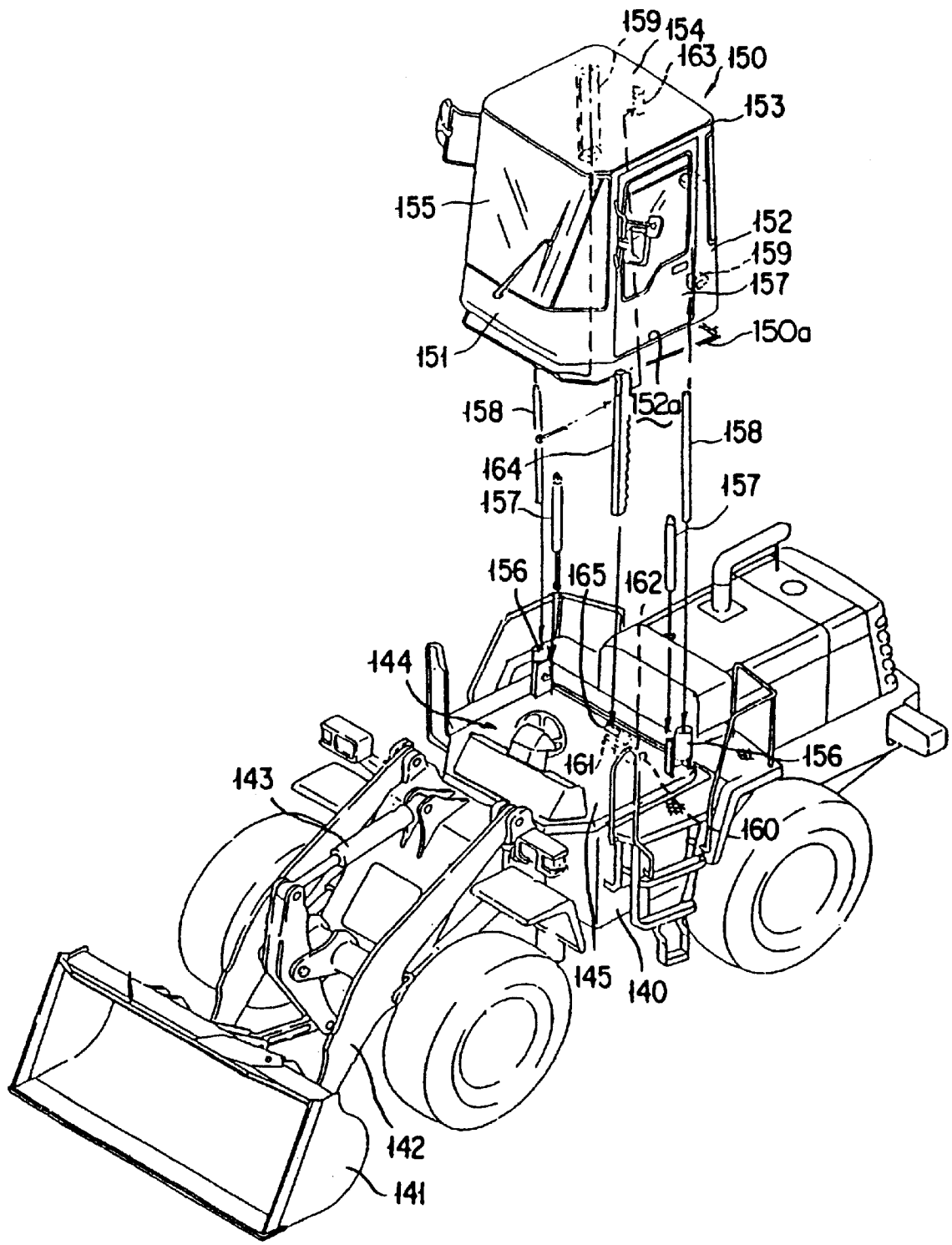
FIG. 15 is an exploded perspective view showing a sixth embodiment of the present invention.

FIG. 15 shows an example of a wheel loader in which a body 140 is equipped with a bucket 141 such that the bucket 141 can pivotally move up and down by an arm 142, a cylinder 143, and so on.

An operator cab floor 144 is installed on an upper surface of the body 140. The operator cab floor 144 has a floor plate 145 on the upper surface of the body 140 such that the floor plate 145 projects outwards from the body 140.

A cabin 150 is in a form of a box which is surrounded by a front plate 151, left and right side plates 152, a rear plate 153 and a roof 154 and is opened downwards. The front plate 151 has a window portion 155. A door-installation opening portion 152a is formed in one of the left and right side plates 152, and a door 157 is installed on the door-installation opening portion 152a such that the door 157 can be opened and closed.

An inner shape of the cabin 150 is similar to and is slightly larger than a plane shape of the operator cab floor 144. A sealing member 150a is attached on a lower edge of the cabin 150.

Guides 156 and gas springs 157 are attached at rear portions of the left and right side edge portions of the floor plate 145. Guide rods 158 to be engaged with the guides 156 are attached on inner surfaces of the side plates 152 of the cabin 150 via brackets 159.

A motor 160 is installed on a lower surface of the floor plate 145. An output torque from the motor 160 is transmitted to a pinion 162 through a decelerator 161. A rack gear 164 is connected to an inner surface of the roof 154 of the cabin 150 by a bracket 163. The rack gear 164 projects downwards through a hole 165 in the floor plate 145 and is engaged with the pinion 162.

Figure 16:
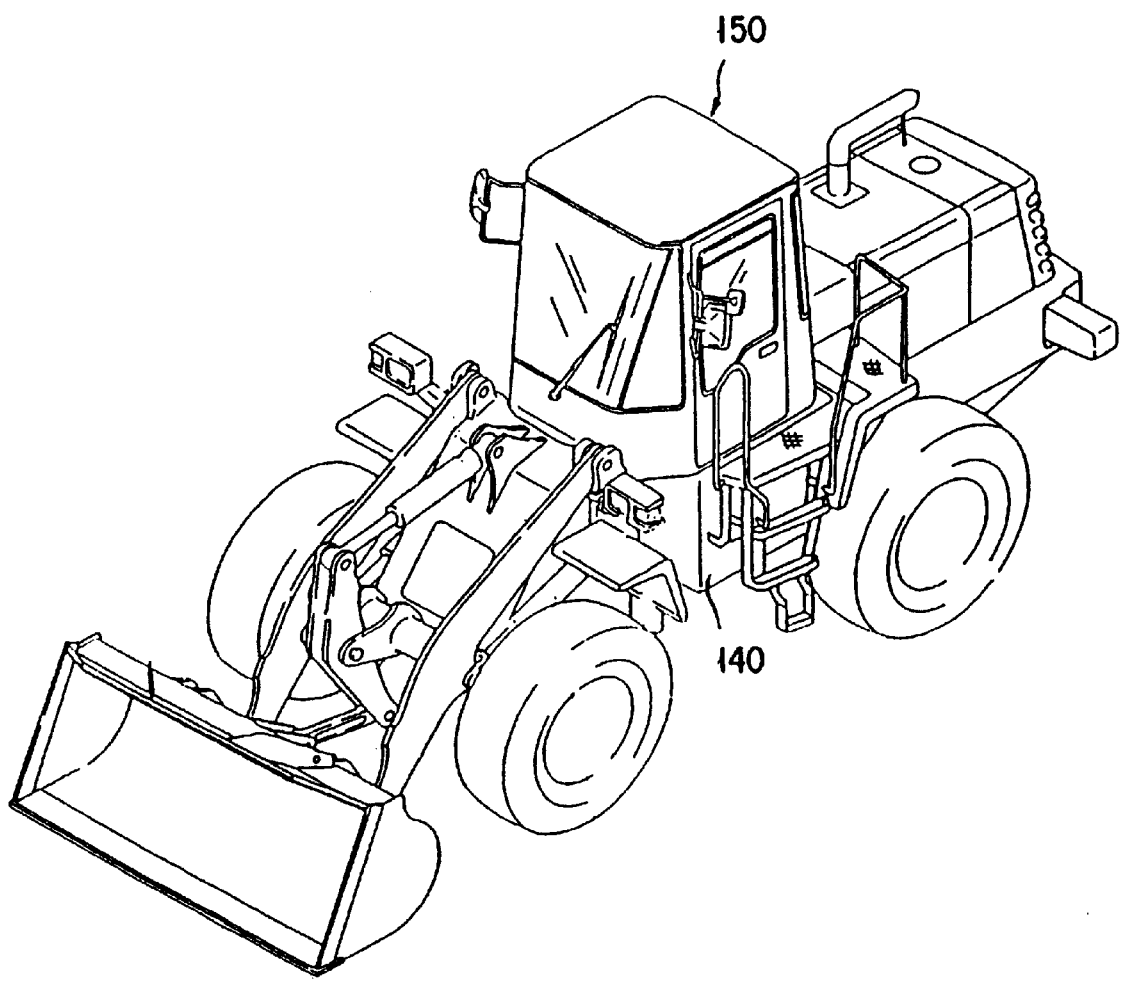
FIG. 16 is a perspective view where the cabin is situated at an upper position.

According to the structure as described above, when the pinion 162 is rotated in one direction by the motor 160, the cabin 150 is moved upwards by the rack gear 164 to the uppermost position as shown in FIG. 16. At that time, the sealing member 158 attached on the cabin 150 is pressed into contact with outer side surfaces of the floor plate 145 to keep air-tightness and water-tightness.

Figure 17:
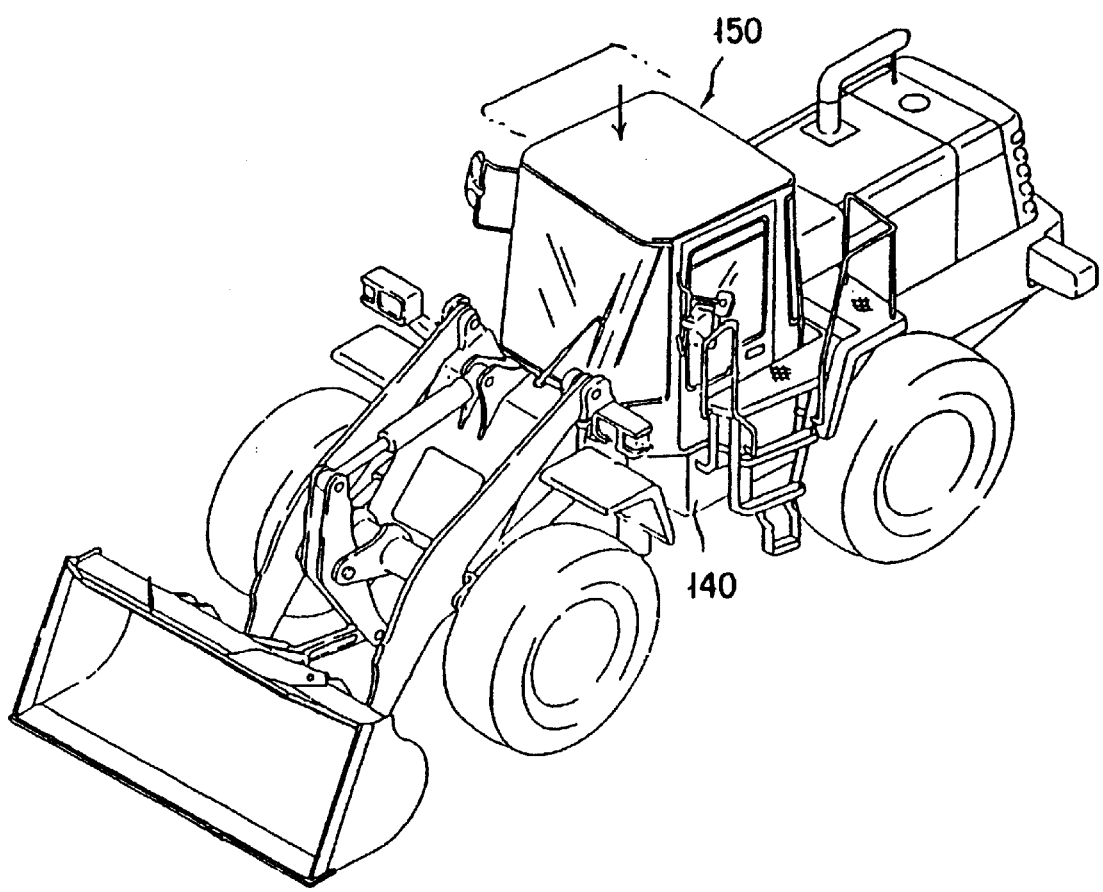
FIG. 17 is a perspective view where the cabin is situated at a lower position.

When the pinion 162 is rotated in the opposite direction by the motor 160, the cabin 150 is moved downwards by the rack gear 164 to its uppermost position as shown in FIG. 17.

According to the first to third embodiments shown in FIGS. 1 to 6, the shaft 34 which is a component of a vertical drive means for the cabin 20 and which also serves as a torsion prevention means for the cabin 20 is arranged to connect the left and right side walls 15 through rack gears 33, so that upward or downward movements of the rack gears 33, i.e. vertical movements of the side walls 15, are thereby synchronized with each other. However, as is apparent from FIG. 1, the shaft 34 is just provided so as to extend laterally along the floor surface in front of an operator seat, and therefore tends to hinder an operator's various operations.

Further, in this kind of construction machine, air-conditioning has been provided in the cabin in recent years. Thus, an air-conditioning equipment is conventionally installed in a lower space below the operator's seat. Therefore, it has been strongly demanded that obstacles as many as possible should be removed from the periphery of the operator seat to maintain an equipment space as well as to respond to necessity for maintenance of the equipment.

Figure 18:
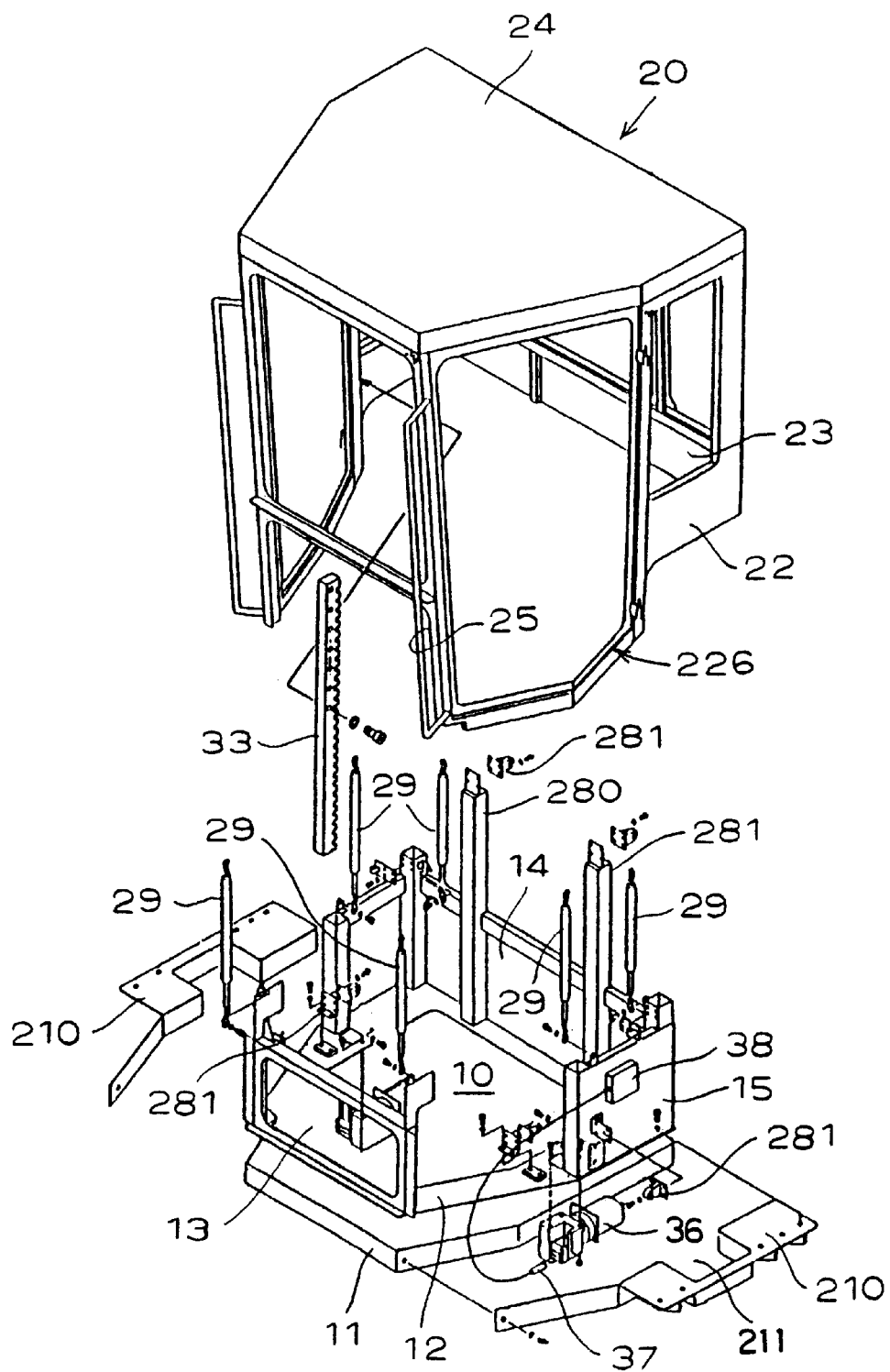
FIG. 18 is an exploded perspective view showing an operator cab floor and a cabin according to a seventh embodiment of the present invention.

FIG. 18 shows a seventh embodiment of a cabin installation structure according to the present invention. The operator cab floor 10 is devoid of a shaft 34. This figure shows an example of a cabin of a motor grader, and same components as those of the first embodiment shown in FIG. 1 are denoted by same reference numerals.

The operator cab floor 10 has a substantially ring-like plate 12 fastened by bolts to a periphery of a floor plate 11 of a body not shown. The operator cab floor 10 further has a front lower window 13 attached along a front edge of the ring-like plate 12. The operator cab floor 10 furthermore has a rear wall 14 standing along a rear edge of the ring-like plate 12, and left and right walls 15 at rear portions of the left and side edges of the ring-like plate 12. An outer periphery of the floor plate 11 projects sidewards from an installation portion of the body, and the outer periphery of the ring-like plate 12 projects sidewards over the floor plate 11.

Guide columns 280 are arranged so as to stand at their lower ends on the ring-like plate 12 along front ends of the left and right rear side walls 15, at respective corners between the left and right rear side walls 15 and the rear wall 14, and an intermediate portion of the rear wall 14, by metal fittings. Further, casters 281 are attached at appropriate positions on the upper and lower outer surfaces of the guide columns 280, the outer surfaces of the rear portions of the left and right rear side walls 15, and the ring-like plate 12, so that vertical movements of the cabin 20 are guided at its inner surfaces by rotation of the casters.

Adjacent to the guide columns, gas springs 29 are respectively attached at their lower ends to respective upper surfaces of the left and right ends of the front lower window 13, the front ends of the left and right side walls 15, and the left and right corner portions between the left and right side walls 15 and the rear wall 14. Upper ends of the gas springs 29 are respectively attached on corresponding portions of a roof 24 of the cabin 20. The cabin 20 is thus urged from the lower side to reduce loads to the drive motor 36 when the cabin 20 is moved up and to buff excessive impact when the cabin 20 is moved down.

The cabin 20 has a substantially box-like shape having five surfaces surrounded by a front plate 21, left and right side plate 22, door portions 226, a rear plate 23, and a roof 24, and opened at its lower surface. The lateral-cross-sectional surface shape of the cabin 20 is set to be similar to and slightly larger than an outer shape of the ring-like plate 12.

One-third portion of the front plate 21 from the lower end thereof is formed as an opening portion 25, and the other upper portion is formed as a window. The inner side surfaces of the opening portion 25 are engaged with the outer side surfaces of the front lower window 13 of the operator cab floor 10. The rear plate 23 and the side plates 22 are shorter than the front plate 21 and the door portions 226 in the lower side thereof. Thus, a gap is provided between the front portions and the rear portions of the cabin 20. The door portions 226 are constituted by frames, one of which is equipped with a door such that the door can be opened and closed.

Rack gears 33 are respectively fastened by bolts to inner surfaces of boundary portions between the left and right side plates 22 and the door portions 226. The rack gears 33 are provided so as to extend throughout the entire heights of the door portions 226 and are opposed to the inner surfaces of the left and side walls 15 of the operator cab floor 10.

According to the present embodiment, lower reinforcement plates 210 are assembled into the operator cab floor 10 fixedly connecting the floor plate 11 and the ring-like plate 12 for closing left and right6 clearances between the floor plate 11 and the ring-like plate 12 and for reinforcement of the ring-like plate 12. Pocket portions 211 are respectively formed in the lower reinforcement plates 210 to contain a pair of drive motors 36 with decelerators fixed on the lower surface of the plate 12 below the left and right side walls 15.

Rotations of the drive motors 36 provided in the left and right sides are respectively transmitted through deceleration mechanisms such as deceleration gears provided in the left and right sides, to a pair of pinions not shown, which are rotatably supported on the left and right side walls 15. These pinions are engaged with the left and right rack gears 33, and the rack gears 33 are independently moved vertically by rotations of the rack gears 33. At that time, if the left and right rack gears 33 do not move in synchronism with each other, torsion is generated between the boundary portions between the left and right door portions 226 and the left and right side plates 22 of the cabin 20 to which the rack gears 33 are fixed, thereby hindering the vertical movements of the cabin. In the example shown in the figure, rotation sensors 37 for detecting the rotation speeds of the drive motors 36 are respectively provided near the drive motors 36, and are connected to an controller 38 which performs feedback control for a purpose of synchronous operation of the left and right rack gears 33 operate synchronously.

Figure 19:
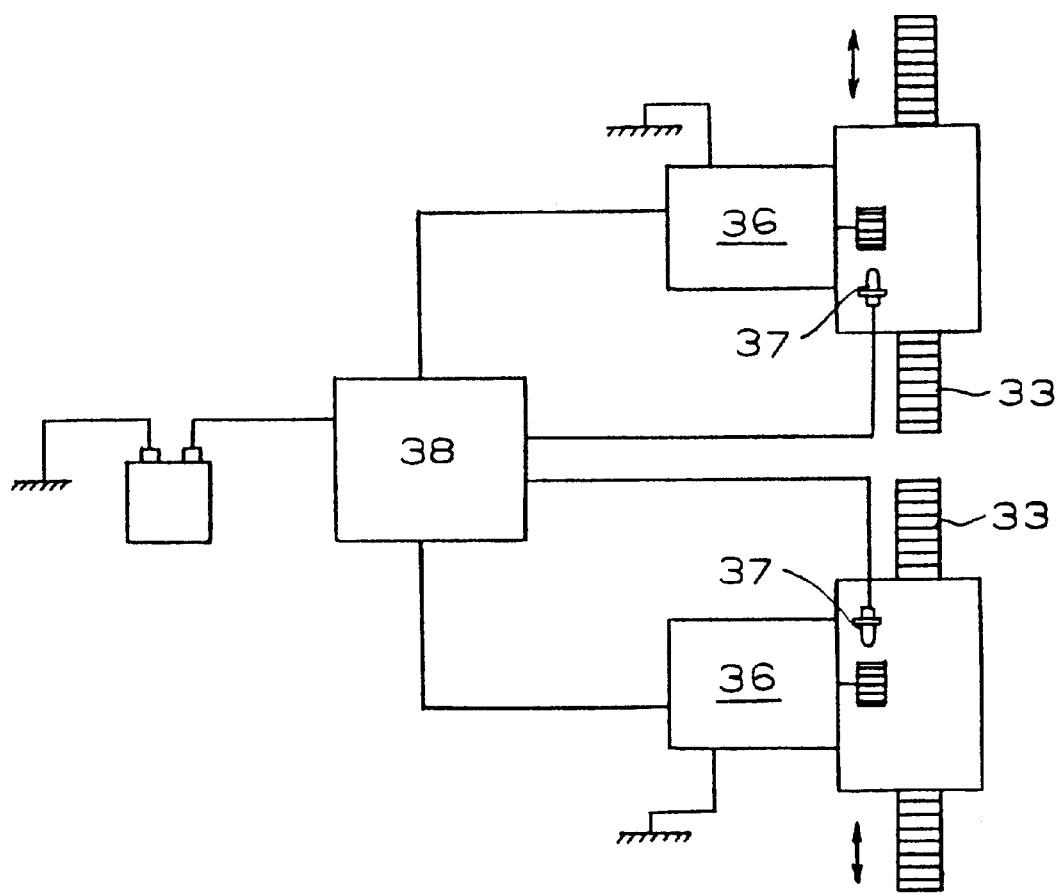
FIG. 19 is a block diagram showing an example of a control circuit for vertical driving of the seventh embodiment.

FIG. 19 shows an example of a control circuit for preventing torsion as described above. The drive motors 36 can be driven and rotated in a regular direction or a reverse direction, by an expansion/contraction switch provided on a controller panel omitted from the figure. Each drive motor 36 may be a direct current motor, a servo motor, or a pulse motor. The rotation speed of such a motor can be controlled by a control signal from the controller 38.

The controller 38 thus connected to the left and right rotation sensors 37 receives detection signals from the left and right rotation sensors 37 and makes comparison and calculations on the signals. When a specified rotation speed difference is exceeded, the drive motor 36 of which rotation speed exceeds is rotated in the reverse direction or stopped, to control the rotation speeds of the left and right sides such that the rotations of the rollers are harmonized.

Thus, since vertical movements of the left and right rack gears 33 are synchronized with each other, torsion of the cabin 20 is not generated but smooth vertical movements are realized. Further, according to the present embodiment, the shaft 34 can be removed from a vicinity of the operator seat unlike in the case in which vertical movements of the left and right rack gears 33 are mechanically synchronized with each other by a shaft 34 connected between the pinions 35 engaged with the rack gears 33 as in the embodiment of FIG. 1. Therefore, in case where an air-conditioning equipment is provided in the vicinity of the operator seat, particularly at a lower space portion, installation of the equipment and later maintenance services thereof are facilitated.

Figure 20:
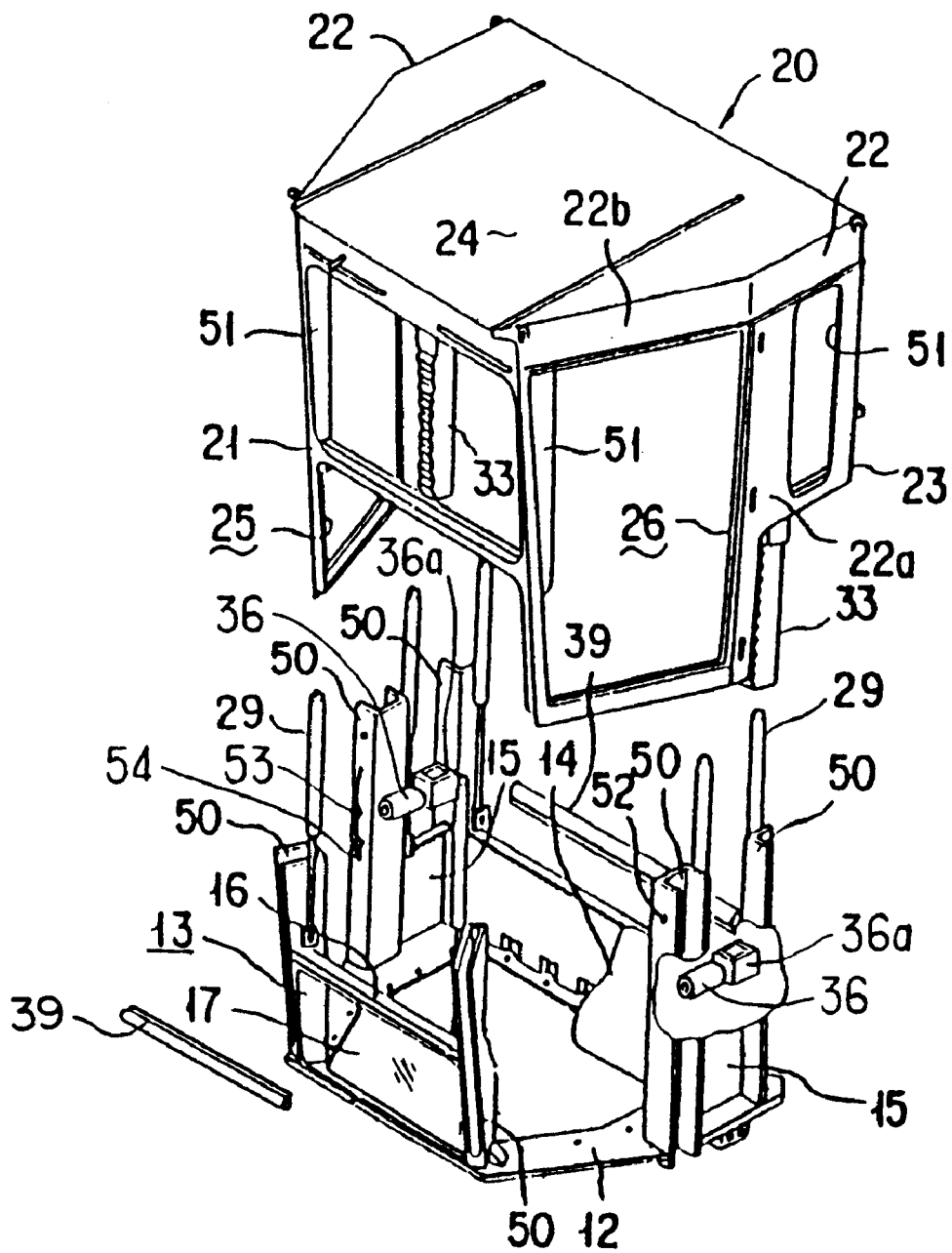
FIG. 20 is an exploded perspective view showing an operator cab floor and a cabin according to a modification of the second embodiment.

FIG. 20 shows a modification of the second embodiment described above. According to the modification shown in this figure, drive motors 36 are not fixedly installed on the ring-like plate 12 like the second embodiment, but are installed at vertically-intermediate positions between front and rear guides 50 forming parts of the left and right side walls. Each of the drive motors 36 is provided with a fixed prismatic hollowed member 36a having therein a pinion not shown but attached on an output shaft of the drive motor 36, for inserting and guiding the rack gear 33. The rotation sensors 37 and the controller 38 are omitted from the figure.

According to the modification, the drive motors 36 are installed at positions where the engagements between the rack gears 33 and the pinions not shown but installed on the drive motors 36 via decelerators are not released when the cabin 20 reaches its upper limit position and where the lower ends of the rack gears 33 do not interfere with tires below or other components when the cabin 20 reaches its lower limit position. By thus arranging the installation positions of the drive motors 36, the length of the rack gears 33 can be shorter than the length of the rack gears 33 according to the seventh embodiment shown in FIG. 18 when the cabin 20 reaches the lower limit position. It is therefore possible to reduce projection of the lower ends of the rack gears 33 toward the other components.

In the above description, the rack gears 33 are fixed and installed to the cabin 20 and the pinions are provided at the operator cab floor 10 for the vertical drive mechanism of the cabin 20 by the rack gears 33 and the pinions. The arrangements of the mechanism in this invention may be arranged inversely.

Figure 21:
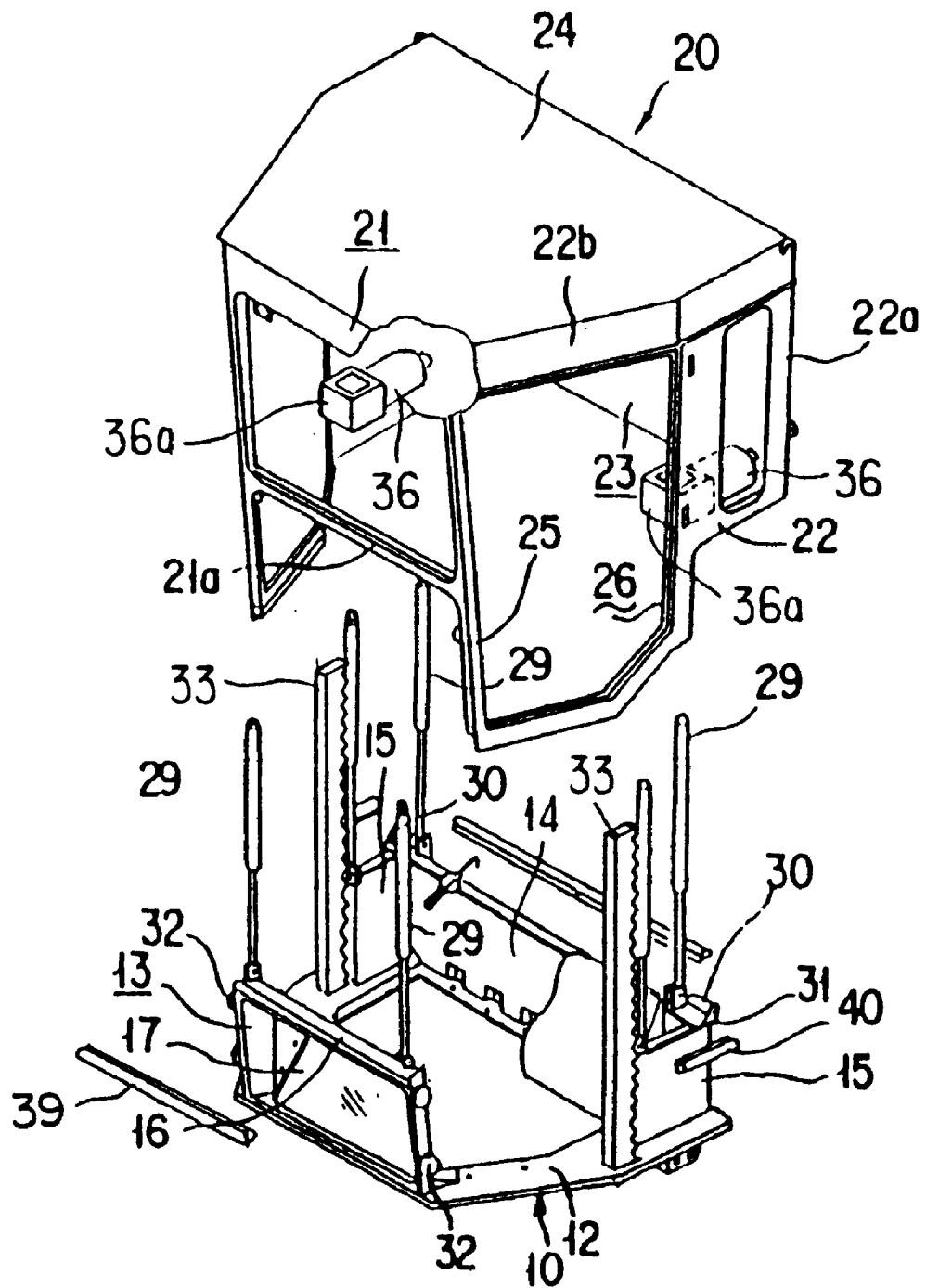
FIG. 21 is an exploded perspective view showing an operator cab floor and a cabin according to an eighth embodiment of the present invention.

FIG. 21 shows an eighth embodiment in which the rack gears 33 and the pinions are arranged inversely unlike in the embodiment described above. According to the embodiment, the rack gears 33 are provided so as to stand on the ring-like plate 12 and the drive motors 36 are fixed on the inner surfaces of lower end portions of rear portions 22a of the left and right side plates 22. Prismatic hollowed members 36a for containing pinions not shown and for guiding insertion of the rack gears 33 are respectively fitted on the drive motors 36. Rotation sensors 37 and a controller 38 are omitted from this figure.

According to the structure described above, the length of the rack gears 33 can be set within a range of vertical movements of the pinions. Further, since the rack gears 33 stand on the ring-like plate 12, the lower ends of the rack gears 33 do not project downwards over the ring-like plate 12, so that interference with lower components can be securely avoided.

As a vertical-drive means of the cabin 20 according to the present invention, wires can be used in place of the rack gears 33 and pinions, or hydraulic cylinders for elevation movements. In this case, wire winders, which are omitted from the figure, are provided appropriately in the left and right sides of the ring-like plate 12 or the cabin 20 described above, and end portions of the wires of which directions are changed by pulleys are fixed to appropriate positions of the cabin 20 or the ring-like plate 12. Further, the vertical movement amount of the cabin 20 can be adjusted by controlling extracted lengths of the left and right wires, for example, by detecting the rotation angles of the left and right wire winders and comparatively calculating the rotation angles by a controller not shown.

If only the torsion needs to be prevented in the present invention, even in the fifth embodiment shown in FIG. 7, it is possible to control supply of hydraulic pressures based on the expansion differences of the respective elevation cylinders 77 obtained by connecting the hydraulic circuit of the elevation cylinders 77 to a controller and by detecting simultaneously respective expansion amounts of the elevation cylinders 77 by hydraulic flow sensors.

Figure 22:
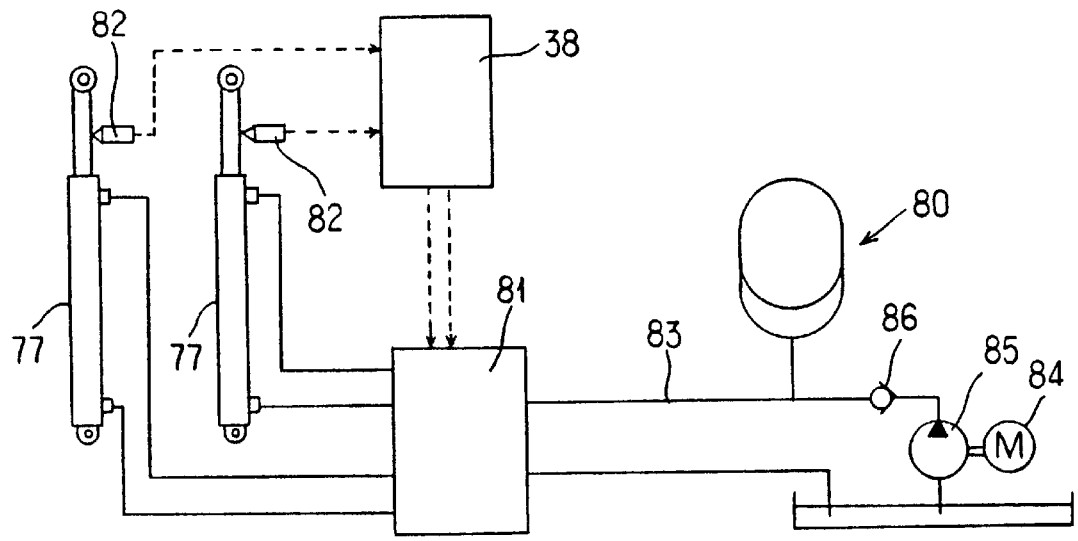
FIG. 22 is a circuit diagram showing an example of a hydraulic circuit adopted in the fourth embodiment.

FIG. 22 shows an example of the hydraulic circuit. According to the example of the hydraulic circuit shown in this figure, a plurality of elevation cylinders 77 (e.g., a pair of left and right cylinders 77 as shown) are connected to hydraulic flow control valves 81 through switch valves not shown, respectively, and each of the valves 81 electronically controls the flow rate by controlling the hydraulic pressure from a hydraulic pressure source, for example, on the basis of a pilot signal from the controller 38. For this control, the elevation cylinders 77 are provided with stroke sensors 82 for detecting expansion amounts of the cylinders 77, respectively. Detection signals from the sensors 82 are sent to the controller 38 and detection amounts are compared with each other by a comparator circuit of the controller 38. If a difference exists between the detection amounts, the cylinders 77 are controlled and operated, thus eliminating the difference.

In this example, an accumulator 80 is used as the hydraulic pressure source. A hydraulic pipe path 83 for supplying a hydraulic pressure to the flow control valves 81 is equipped with a check valve 86 between the path and a hydraulic pump 85 driven by an engine 84 installed on a body, and the accumulator 80 is connected to the hydraulic pipe path 83. The accumulator 80 is operated when the engine 84 is stopped, and the hydraulic pressure thereof is supplied to the elevation cylinders 77 through the flow control valves 81.

Figure 23:
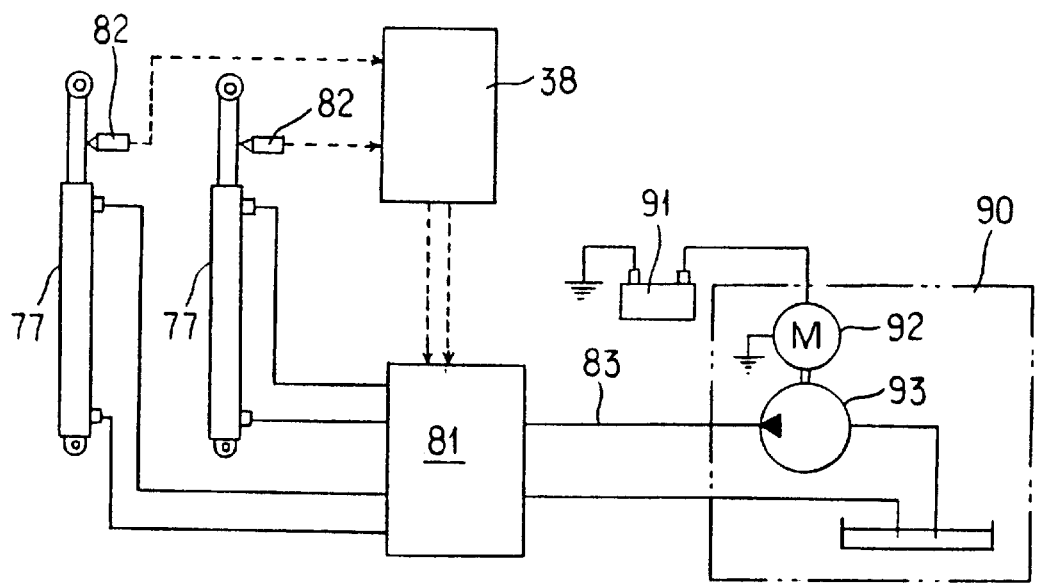
FIG. 23 is a circuit diagram showing another example of a hydraulic circuit.

FIG. 23 shows an example in which a power package 90 is adopted as a hydraulic pressure source in place of the accumulator 80. The power package 90 has an electric motor 92 specialized for vertical movement of the cabin, which is driven by a battery 91, and supplies a hydraulic pressure directly to the flow control valves 81 through a hydraulic path 83 from a hydraulic pump 93 operated by the electric motor 92.

What is claimed:

1. A cabin-installation structure for a construction machine, for installing a box-like cabin of which lower surface is opened, on a body of a construction machine having an operator cab floor, comprising:

the cabin having a lateral-cross-sectional surface shape substantially similar to and slightly larger than a plane shape of the operator cab floor, and an inner surface positioned outside outer side surfaces of the operator cab floor and is movable in a direction vertical to the operator cab floor;

a guide mechanism for moving and guiding the cabin in said vertical direction; and a vertical-drive means for vertically moving the cabin between an upper position where a lower edge of the cabin is positioned at a height substantially equal to the operator cab floor and a lower position where the lower edge of the cabin projects downwards below the operator cab floor.

2. A cabin-installation structure according to claim 1, wherein the cabin further has a door-installation opening portion in a side surface of the cabin, said door-installation portion being continuous in said vertical direction so that a door installed on the door-installation opening portion can be opened and closed.

3. A cabin-installation structure according to claims 1 or 2, further comprising an urging means between the cabin and the operator cab floor for elastically urging the cabin upwards.

4. A cabin-installation structure according to claims 1, 2 or 3, wherein the vertical-drive means operates the cabin by supporting left and right side plates of the cabin and includes torsion-prevention means for preventing torsion of the cabin.

5. A cabin-installation structure according to claim 4, wherein the torsion-prevention means of the cabin is a connection member of a rigid body connecting respective portions of left and right side wall of the operator cab floor.

6. A cabin-installation structure according to claim 4, wherein the torsion-prevention means of the cabin has a vertical-movement-distance-detector means and a comparison calculation circuit for controlling movement amounts of the left and right side plates of the cabin to be equalized to each other, based on comparison calculation results thereof.

7. A cabin-installation structure for a construction machine, for installing a box-like cabin of which lower surface is opened, on a body of a construction machine having an operator cab floor, comprising:

the cabin having a lateral-cross-sectional surface shape substantially similar to and slightly larger than a plane shape of the operator cab floor, an inner surface positioned outside outer side surfaces of the operator cab floor and is movable in a direction vertical to the operator cab floor, and a door-installation opening portion on a side surface of the cabin, the door-installation opening portion being continuous in a direction vertical to the operator cab floor so that a door installed on the door-installation opening portion can be opened and closed;

a guide mechanism for moving and guiding the cabin in said vertical direction; and a lock mechanism for locking the cabin at an upper position where a lower edge of the cabin is positioned at a height substantially equal to the operator cab floor and at a lower position where the lower edge of the cabin projects downwards below the operator cab floor.

8. A cabin-installation structure according to claims 1 or 7, wherein a side surface of the cabin has a step-like shape such that a front portion of a lower edge of the side surface forms a lower step and a rear portion of a lower edge of the side surface forms an upper step and such that the door-installation opening portion is formed at the front portion of the side surface, and when the cabin is positioned at the lowermost position, the front portion of the lower edge of the side surface projects downwards below the operator cab floor and the rear portion of the lower edge of the side surface is positioned to be slightly higher than the operator cab floor.

* * * * *